(12) United States Patent
Hatanaka et al.

(10) Patent No.: US 7,185,995 B2
(45) Date of Patent: Mar. 6, 2007

(54) BACKLIGHT DEVICE AND LIQUID CRYSTAL DISPLAY

(75) Inventors: Masato Hatanaka, Saitama (JP); Kazuhiro Yokota, Saitama (JP); Takashi Oku, Saitama (JP); Shinsuke Kito, Kanagawa (JP); Yuichiro Maruyama, Tokyo (JP); Sinobu Yamada, Tokyo (JP); Kouji Iida, Chiba (JP); Seiji Miyamura, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/571,719

(22) PCT Filed: Aug. 18, 2004

(86) PCT No.: PCT/JP2004/011852

§ 371 (c)(1),
(2), (4) Date: Mar. 13, 2006

(87) PCT Pub. No.: WO2005/028950

PCT Pub. Date: Mar. 31, 2005

(65) Prior Publication Data

US 2006/0215386 A1    Sep. 28, 2006

(30) Foreign Application Priority Data

Sep. 19, 2003  (JP)  ............................. 2003-327825

(51) Int. Cl.
*F21V 5/00* (2006.01)

(52) U.S. Cl. .................. 362/29; 362/223; 362/225

(58) Field of Classification Search .................. 362/29, 362/618, 224, 223, 225
See application file for complete search history.

(56) References Cited

U.S. PATENT DOCUMENTS

| | | | |
|---|---|---|---|
| 2002/0197051 A1* | 12/2002 | Tamura et al. | 385/146 |
| 2004/0032725 A1* | 2/2004 | Hsieh et al. | 362/31 |
| 2005/0275766 A1* | 12/2005 | Liu et al. | 349/64 |

FOREIGN PATENT DOCUMENTS

| | | |
|---|---|---|
| JP | 2-36818 | 3/1990 |
| JP | 3-160031 | 7/1991 |
| JP | 6-301034 | 10/1994 |
| JP | 9-236803 | 9/1997 |
| JP | 2003-105229 | 4/2003 |

* cited by examiner

*Primary Examiner*—Laura K. Tso
(74) *Attorney, Agent, or Firm*—Sonnenschein Nath & Rosenthal LLP

(57) ABSTRACT

A light dimming dot pattern is provided for an LCD in which the diameter of dots is changed in a range from approximately 0.16 mm to approximately 0.65 mm depending on the distance of the dots from a fluorescent tube (13) in such a manner that the volume of the shielded light is increased and decreased at a location close to a position overlying the fluorescent tube (13) and at a location remote from the fluorescent tube (13), respectively. In this manner, a light dimming dot pattern with a transmittance for all light rays of approximately 62% (roughly in the vicinity of 62%), higher than the transmittance for all light rays in the conventional technique not higher than 50%, is produced. Consequently, the light of uniform high luminance may be produced without raising the luminance of the fluorescent tube (13), and hence an LCD of high luminance may be realized.

36 Claims, 22 Drawing Sheets

(only light diffusing light guide plate)

(light diffusing light guide plate
and light dimming dot pattern printed thereon)

(number of times of printing is one)

(number of times of printing is two or three)

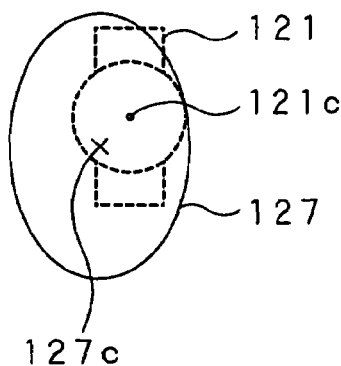

FIG.25

Example 1

| liquid crystal display panel | panel size: 46 inches |
|---|---|
| LED unit | unit-to-unit pitch : 80mm |
| LED | repetition of G:R:G:B |
| light diffusing light guide plate | material: poluolefin<br>transmission for all light rays: 90%<br>cloud value: 70% |
| light dimming dot pattern | (light dimming dot pattern P1)<br>ink used: white ink for polyolefin<br>ultraviolet light inhibitor: 5 wt%<br>anti-foaming agent: 0.2 wt%<br>light dimming dot: ellipse of 7 by 11 mm<br>area of light dimming dot: ca. 68 mm$^2$<br>number of times of printing: once (undercoat) |
| | (light dimming dot pattern P2)<br>ink used: gray color ink(*)<br>(*) generated by mixing 0.5 wt% of black ink to white ink for polyolefin<br>ultraviolet light inhibitor: 5 wt%<br>anti-foaming agent: 0.2 wt%<br>light dimming dot: ellipse of 7 by 9.5 mm<br>area of light dimming dot: ca. 56 mm$^2$<br>number of times of printing: once<br>(overcoat: overlay coating on light dimming dot pattern P1) |

FIG.26

Example 2

| liquid crystal display panel | panel size: 40 inches |
|---|---|
| LED unit | unit-to-unit pitch : 85mm |
| LED | repetition of G:R:G:B |
| light diffusing light guide plate | material: PMMA<br>transmission for all light rays: 93%<br>cloud value: 90% |
| light dimming dot pattern | ink used: white coucentrated ink<br>ultraviolet light inhibitor: 6 wt%<br>anti-foaming agent: 0.1 wt%<br>light dimming dot: circle of 7 mm in diameter<br>area of light dimming dot: ca. 38 mm$^2$<br>number of times of printing: three |

FIG. 27

Example 3

| liquid crystal display panel | panel size: 40 inches |
|---|---|
| LED unit | unit-to-unit pitch : 85mm |
| LED | repetition of G:R:G:B |
| light diffusing light guide plate | material: polyolefin<br>transmission for all light rays: 55%<br>cloud value: 92.5% |
| light dimming dot pattern | ink used: white ink for polyolefin<br>ultraviolet light inhibitor: 7 wt%<br>anti-foaming agent: 0.25 wt%<br>light dimming dot: ellipse of 7 by 11 mm<br>area of light dimming dot: ca. 86 mm$^2$<br>number of times of printing: two |

FIG. 28

Example 4

| liquid crystal display panel | panel size: 32 inches |
|---|---|
| LED unit | unit-to-unit pitch : 70mm |
| LED | repetition of G:R:G:B |
| light diffusing light guide plate | material: polyolefin<br>transmission for all light rays: 50%<br>cloud value: 93% |
| light dimming dot pattern | ink used: white concentrated ink<br>ultraviolet light inhibitor: 4 wt%<br>anti-foaming agent: 0.1 wt%<br>light dimming dot: circle of 6 mm in diameter<br>area of light dimming dot: ca. 28 mm$^2$<br>number of times of printing: one |

FIG.29

BACKLIGHT DEVICE AND LIQUID CRYSTAL DISPLAY

TECHNICAL FIELD

This invention relates to a backlight device and a liquid crystal display apparatus. More particularly, the present invention relates to a backlight device emitting light to high luminance with low power usage, and a liquid crystal display apparatus provided with this backlight device.

The present application contains subject matter related to Japanese Patent Application JP 2003-327825, filed in the Japanese Patent Office on Sep. 19, 2003, the entire contents of which being incorporated herein by reference.

BACKGROUND ART

As a display apparatus, a liquid crystal display (LCD) is in widespread use.

The LCD, a display apparatus exploiting liquid crystal, has liquid crystal enclosed in a space between two transparent plates, and displays a picture by applying a voltage thereto for changing the orientation of liquid crystal molecules for thereby changing light transmittance. The liquid crystal, forming an LCD, does not itself emit light, so that the picture is demonstrated using reflected light in a light place, and using the light from plural light emitting units (backlight device) arranged on the rear side, in a dark place. Since the LCD is thinner and lighter in weight than other display apparatus, such as cathode ray tube (CRT) or a plasma display panel (PDP), it is used widely for a mobile computer or a space saving desk top personal computer.

As a light source used in a backlight device, a point light source, radiating light as a dot, such as light emission diode (LED), or a fluorescent tube, radiating light as a line, is used. The backlight device is of an edge light configuration or a subjacent configuration, depending on the disposition of the point or linear light sources.

The edge light configuration backlight device guides the light, radiated from a point light source or a linear light source arranged on a lateral side of the light guide plate, for emitting light by planar light radiation. The subjacent configuration backlight device diffuses light radiated from plural point light sources or linear light sources, arranged directly below the liquid crystal display panel, using a light diffusing plate, to emit light by planar light radiation. The subjacent configuration backlight device includes e.g. a reflecting plate, arranged on the back surface of the light source, for improving the utilization efficiency of light radiated from a point or linear light source for reducing the loss of emitted light.

With the subjacent backlight device, plural point or linear light sources are arranged, at a preset distance from one another, directly below the liquid crystal display panel. Since the respective light sources exhibit light emitting directivity, the light intensity differs depending on the direction of light emission, and hence the light emitted by planar light radiation must be equalized in luminance over the entire surface. For example, if a linear light source is used for the subjacent backlight device, the light intensity is strongest at a location directly above each of plural linear light source, arranged side-by-side with one another, with the light intensity becoming weaker in a direction proceeding away from the light source. Specifically, except if the light is equalized sufficiently, the radiated light forms a replica of the location of the light source, that is, there is displayed a dot-shaped lamp image or a striped dot image for a point light source or a linear light source, respectively.

For example, if the number of the light sources arranged is increased for reducing the spacing between the neighboring light sources, the radiated light may be equalized by raising the degree of light diffusion of the light diffusing plate to a certain extent. However, if the number of the light sources is increased, the cost of the backlight device and hence that of the LCD are raised. On the other hand, if the degree of light diffusion of the light diffusing plate is increased, there is presented a problem that the luminance cannot be increased in proportion to the larger number of the light sources used.

It may be contemplated to increase the separation between the light source and the light diffusing plate to reduce the difference in the distance from the light source up to respective locations on the light diffusing plate. However, such increased distance between the light source and the light diffusing plate may give rise to an increased thickness of the backlight device and hence an increased thickness of the LCD.

Thus, in a subjacent configuration backlight device, employing a fluorescent tube, which is a linear light source, as a light source, a transparent film, having a light dimming pattern, vapor deposited thereon in register with the fluorescent tube, is arranged between the fluorescent tube and the light diffusing plate, or a light dimming pattern is printed on a light diffusing plate. This light dimming pattern is a pattern of dots containing e.g. a light shielding agent in its composition, and shields the light emitted from the fluorescent tube depending on the dot size to provide for equalized luminance.

An example of a backlight device provided with a light diffusing layer and a light volume equalizing layer by a light transmitting dot pattern is disclosed in Japanese Laid-Open Patent publication H06-301034.

In general, the light transmitted through the light diffusing plate generates a lamp image, recognizable by a human eye, unless the difference in luminance between the luminance value at a location directly above a light source and that at a location partway between the light source and the neighboring light source is reduced to 500 cd/m$^2$ or less.

When the light dimming pattern, discussed in connection with the related art is used for equalizing the luminance, the above difference in luminance of 500 cd/m$^2$ or less may be realized with the light dimming pattern which reduces the transmittance for all light rays of the light guide plate to an extremely low value of 50% or less.

However, with the use of this light dimming pattern, the volume of light transmitted through the light diffusing plate is decreased, thus presenting a problem that the luminance is lowered significantly. For eking out this deficiency and providing sufficient luminance for illumination, excess power has to be supplied to the power source, thus wasting the power.

DISCLOSURE OF THE INVENTION

It is an object of the present invention to provide a subjacent backlight device, employing a point light source or a linear light source, as a light source, in which luminance of light radiated on planar light radiation may be equalized, as a sufficient luminance value is guaranteed, without increasing the power consumed in the light source, and a liquid crystal display apparatus provided with this backlight device.

The present invention provides a backlight device comprising a plurality of cold cathode ray tubes, and a light diffusing plate arranged in the direction of light radiation from the cold cathode ray tubes, and having printed thereon a light dimming dot pattern with transmittance for all light rays of 62 to 71% and a cloud value of 90 to 99%, wherein each dot of the light dimming dot pattern is arranged at a location corresponding to division by 24 to 48 of the spacing between neighboring ones of the cold cathode ray tubes, with the diameter of each dot being 0.16 to 0.7 mm depending on the distance from the cold cathode ray tubes.

With this backlight device, a sufficient luminance value may positively be obtained, without increasing the power usage of the power source, while the light radiated with planar light radiation may be equalized.

The present invention also provides a liquid crystal display apparatus including a light transmitting liquid crystal display panel and a backlight device for illuminating the liquid crystal display panel from the back side thereof, in which the backlight device comprises a light source, made up by a plurality of cold cathode ray tubes, and a light diffusing plate arranged in the light radiating direction of the light source for facing the light source, with the light diffusing plate having a transmittance for all light rays of 62 to 71% and a cloud value of 90 to 99% and carrying a light dimming dot pattern thereon. The dots of the light dimming dot pattern are formed on the light diffusing plate lying at a location corresponding to division by 24 to 48 of the spacing between neighboring ones of the cold cathode ray tubes, with the diameter of the dots being 0.16 to 0.7 mm depending on the distance from the cold cathode ray tubes.

The present liquid crystal display apparatus has a sufficient luminance value, positively obtained by the backlight device, without increasing the power usage of the power source, and illuminates the liquid crystal display panel with planar radiated light with equalized luminance.

The present invention also provides a backlight device comprising a light source made up by a plurality of light emitting diodes, radiating red light, green light and blue light, and a light diffusing light guide plate arranged in the direction of light projection of the light source, and having a transmittance for all light rays of 50 to 93% and a cloud value of 70% to 93%, the light diffusing light guide plate carrying a light dimming dot pattern and being configured for mixing the red light, green light and blue light incident thereon. The dots of the light dimming dot pattern are formed facing the light emitting diodes on the light diffusing light guide plate with one-for-one correspondence to the light emitting diodes so that the dot shape is symmetrical or non-symmetrical relative to the center of light emission of the light emitting diode, with the area of each dot being 28 to 86 mm².

With this backlight device, a sufficient luminance value may positively be obtained, without increasing the power usage of the power source, while the light radiated with planar light radiation may be equalized.

The present invention also provides a liquid crystal display apparatus including a light transmitting liquid crystal display panel and a backlight device for illuminating liquid crystal display panel from the back side thereof, in which the apparatus comprises a light source made up by a plurality of light emitting diodes, radiating red light, green light and blue light, and a light diffusing light guide plate arranged in the direction of light projection of the light source, for facing the light source, and having a transmittance for all light rays of 50 to 93% and a cloud value of 70% to 93%, the light diffusing light guide plate carrying a light dimming dot pattern and being configured for mixing the red light, green light and blue light incident thereon. The dots of the light dimming dot pattern are formed facing the light emitting diodes on the light diffusing light guide plate with one-for-one correspondence to the light emitting diodes so that the dot shape is symmetrical or non-symmetrical relative to the center of light emission of the light emitting diode, with the area of each dot being 28 to 86 mm².

The present liquid crystal display apparatus has a sufficient luminance value, positively obtained by the backlight device, without increasing the power usage of the power source, and illuminates the liquid crystal display panel with planar radiated light with equalized luminance.

That is, the backlight device of the present invention may radiate light to high luminance with uniform light emission, with low power usage of the power source, in case a linear or point light source is used as the light source, and hence may be reduced in thickness.

The liquid crystal display apparatus may also be reduced in thickness and may illuminate the liquid crystal display panel with white light free of luminance irregularities and superior in color mixing properties. Consequently, an optimum picture may be demonstrated on the liquid crystal display panel.

Other objects and specified advantages of the present invention will become more apparent from the following explanation of preferred embodiments thereof especially when read in conjunction with the drawings.

BRIEF DESCRIPTION OF THE DRAWINGS

FIG. 20A illustrates the state of the color irregularities and FIG. 20B shows a light source and the light diffusing light guide plate which lead to the result of FIG. 20A.

FIG. 21A illustrates the state of the color irregularities and FIG. 21B shows a light source and the light diffusing light guide plate which lead to the result of FIG. 21A.

FIG. 22A shows a light source and a light diffusing light guide plate and FIG. 22B shows the state of color irregularities for FIG. 22A.

FIG. 23A shows a light source and a light diffusing light guide plate and FIG. 23B shows the state of color irregularities for FIG. 23A.

FIG. 25 shows the position relationships between light dimming dots forming the light dimming dot pattern and the light emitting diodes.

FIG. 26 shows conditions for the backlight device of a first embodiment of the present invention.

FIG. 27 shows conditions for the backlight device of a second embodiment of the present invention.

FIG. 28 shows conditions for the backlight device of a third embodiment of the present invention.

FIG. 29 shows conditions for the backlight device of a fourth embodiment of the present invention.

BEST MODE FOR CARRYING OUT THE INVENTION

In the following, the relationship of correspondence between the invention stated in the present specification and preferred embodiments thereof is shown, by way of an example. The following description is made for confirming that the embodiments supporting the invention stated in the present specification has been stated in the present specification. Therefore, if there is such an embodiment stated in the present specification but not stated as corresponding to the present invention, it does not mean that the embodiment in question is not relevant to the present invention. Conversely, if there is such an embodiment stated herein as corresponding to the present invention, it does not mean that the embodiment in question is not relevant to an invention other than the present invention.

Additionally, this description is not directed to the invention, in its entirety, stated in the present specification. Stated differently, the present description is not intended to negate the presence of an invention stated in the present specification but not claimed in the present application, viz. the presence of an invention that may become the subject matter of a future divisional application or an invention that may be newly presented or introduced by future amendment.

First Embodiment (Light Source; Cold Cathode Ray Tube)

Initially, a liquid crystal display apparatus, shown as a first embodiment of the present invention, will be explained.

(Structure of the Liquid Crystal Display Apparatus)

A liquid crystal display apparatus, shown as a first embodiment, uses a cold cathode ray tube, which is a line light source, as a light source of the subjacent backlight device.

Figure 1:
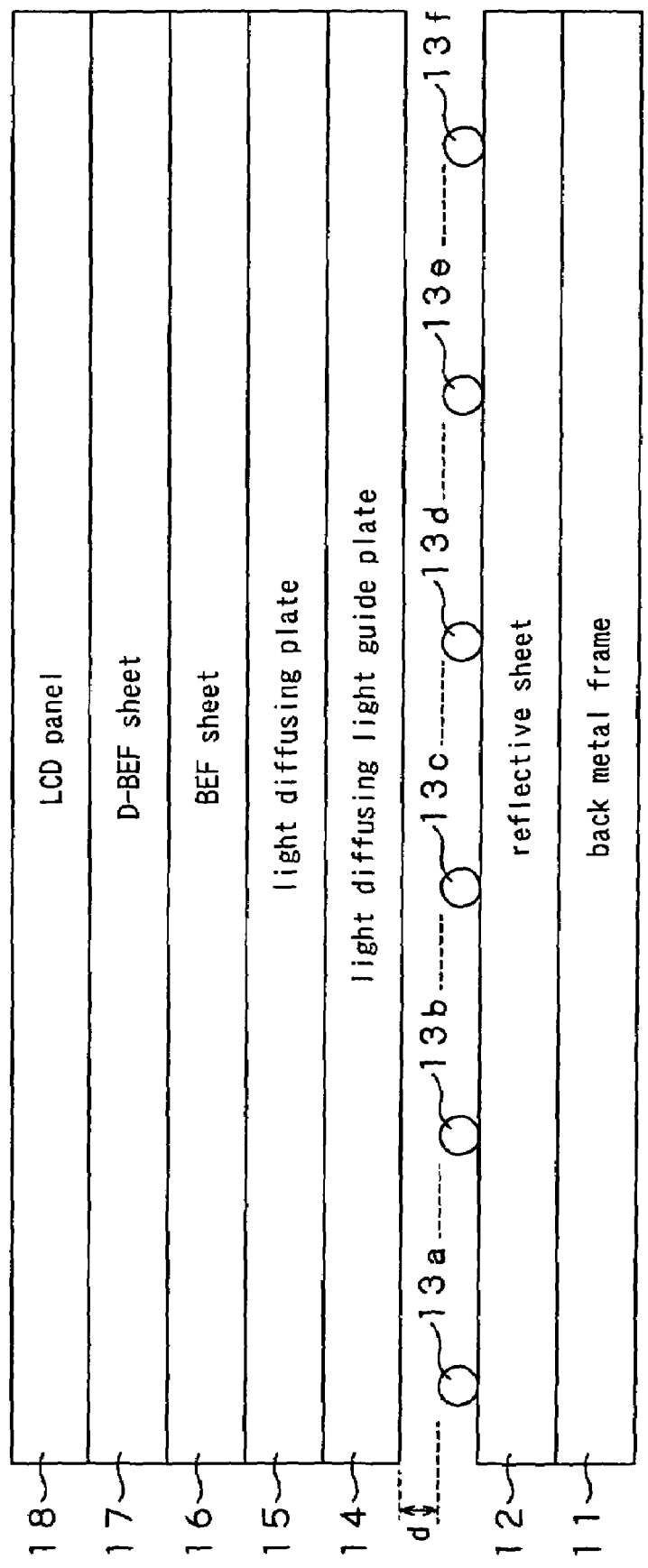
FIG. 1 illustrates the structure of a liquid crystal display apparatus according to a first embodiment of the present invention.

This backlight device includes plural cold cathode ray tubes (for example, fluorescent tubes 13a to 13f of FIG. 1) and a light diffusing plate, including a transmittance for all light rays of 62 to 71%, in the direction of light projection of the plural cold cathode ray tubes (e.g. fluorescent tubes 13a to 13f of FIG. 1) and a cloud value of 90 to 99%, and having a light dimming dot pattern printed thereon, such as a light diffusing plate 15 of FIG. 1. The backlight device is characterized by the fact that the dots of the light dimming dot pattern are disposed at points resulting from division of the spacing between the cold cathode ray tubes into 24 to 48 sections, and by the fact that the diameter of the dots is 0.16 to 0.7 mm depending on the distance of the dots from the cold cathode ray tube.

FIG. 1 shows the structure of a first embodiment of a subjacent surface light emitting type liquid crystal display apparatus according to the present invention. FIG. 1 shows a side view of an LCD. An image is displayed on an LCD panel 18 and a user views an image displayed on the LCD panel 18 from a position above the plane of FIG. 1. It is noted that a frame constituting an enclosure of an LCD, electrical wiring or circuitry, existing really, are not shown in FIG. 1.

A back metal frame 11 is a section as one with an enclosure of the LCD, or a section mounted on the enclosure. A surface of a reflective sheet 12, which is an upper surface in the drawing, is finished as a mirror surface, such that, of the light radiated from the fluorescent tubes 13a to 13f and illuminated (projected) in a direction opposite to that towards the LCD panel 18, is reflected towards the LCD panel 18, such that the light radiated from the fluorescent tubes 13a to 13f is illuminated highly efficiently to the LCD panel 18. Meanwhile, it is sufficient that the reflective sheet 12 reflects light, it being not mandatory that the reflective plate is in the form of a sheet. Hence, a reflective plate, for example may be provided in place of the reflective sheet 12.

The fluorescent tubes 13a to 13f are constituted by cold cathode ray tubes, each approximately 2 mm in diameter, and radiate white light with radiating light luminance not lower than 17000 cd/m$^2$, either directly or through the reflective sheet 12, by electrical power supplied from a circuit, not shown. The fluorescent tubes 13a to 13f are arranged at a preset spacing one from another. Meanwhile, if there is no necessity for distinguishing the fluorescent tubes 13a to 13f from one another, they are collectively termed fluorescent tubes 13. Although six fluorescent tubes 13a to 13f are provided in FIG. 1, any suitable number of the fluorescent tubes 13 may be provided and arranged, depending on the size of the liquid crystal display apparatus.

A light diffusing light guide plate 14 guides the light, incident from the fluorescent tubes 13 or the reflective sheet 12, towards the light diffusing plate 15. In more detail, the light diffusing light guide plate 14 is formed of acrylic resin and, as the light incident thereon from the fluorescent tubes 13 or the reflective sheet 12 proceeds through the bulk of the acrylic resin plate, as it is subjected to refraction and reflection, it changes its direction and light components, the reflection angle of which has become smaller than the total reflection angle, emerge from the surface of the light diffusing light guide plate 14, formed by the plate of acrylic resin, as the light components are diffused. The light is introduced in this manner into the light diffusing plate 15 which then guides the light as it diffuses the light. The light diffusing light guide plate 14 is provided at a distance d of approximately 7 mm or less from the set of the fluorescent tubes 13.

The light diffusing plate 15 is a plate of milk-white color (with cloud value of, for example, 90 to 99%) of a preset plate thickness, such as ca. 2 mm. The light incident from the light diffusing light guide plate 14 is diffused and transmitted through a BEF sheet 16. In more detail, the light incident on the light diffusing plate 15 generates fringes, forming lamp images, depending on the positions of the fluorescent tubes 13, as described above. On the front or back surface of the light diffusing plate 15 is printed a light dimming dot pattern, as later explained, using an ink having desired characteristics. The light dimming dot pattern is sometimes referred to below as a dot pattern.

The so printed light dimming dot pattern reflects the incident light by reflectivity proper to the ink. The light dimming dot pattern efficiently diffuses and reflects the incident light by light shielding properties of the light shielding agent added to the ink and by light diffusing properties proper to a light diffusing agent similarly added to the ink. On the other hand, the light incident on the plain portion of the light diffusing plate 15 where no light dimming dot pattern is printed is not reflected but is guided to proceed into the bulk of the light diffusing plate 15. The light incident on the diffusing plate 15 undergoes inner diffusion in the light diffusing plate 15. The light diffusing plate 15, having the light dimming dot pattern printed thereon, is able to suppress the lamp image, which is of a problem in surface light radiation of the light emanated from a line light source, in order to provide for equalized luminance of the entire surface. This light dimming dot pattern will be explained subsequently in detail.

A BEF (Luminance Enhancement Film) sheet 16 (registered trademark of Sumitomo 3M), which is a luminance improving sheet for P-polarized light, collects the P-component of light radiated from the light diffusing plate 15 and which has become deviated from the angle of field of view of the liquid crystal of the LCD panel 18 (angle with respect to the direction orthogonal to the LCD panel 18, which angle allows the user to perceive light transmitted through the LCD panel 18) and transmits the light through the LCD panel 18 as the BEF sheet restricts the direction of light proceeding upwards in FIG. 1. That is, since there is the angle of field of view in the liquid crystal of the LCD panel 18, the light deviated by more than a preset angle from the direction orthogonal to the LCD panel 18 is not visible to the user, even if it has been transmitted through the LCD panel 18. Thus, the BEF sheet 16, formed in keeping with the angle of field of view of the liquid crystal, collects P-components of light exiting in a direction offset from the angle of field of view, and causes the so collected light components to proceed towards the front side of the LCD panel 18 to make efficient utilization of light to improve the apparent luminance. Meanwhile, the BEF sheet 16 directly transmits an S-component through a D-BEF sheet 17 without processing the component.

The D-BEF sheet 17, which is a luminance improving sheet for S-polarized light, converts the S-component of the incident light into a P-component and thereafter collects light offset from the angle of field of view of the LCD panel 18 to cause the light to be transmitted through the LCD panel 18 as the light proceeding direction is restricted to an upward direction in the drawing. That is, since only the P-component is transmitted through the LCD panel 18, the D-BEF sheet 17 polarizes the S-component into the P-component and processes the resulting P-component in the same way as does the BEF sheet 16 to permit the resulting P-component to be transmitted through the LCD panel 18. Meanwhile, the D-BEF sheet 17 allows the P-component, processed by the BEF sheet 16, to be transmitted directly through the LCD panel 18 without processing the component.

That is, the BEF sheet 16 and the D-BEF sheet 17, convert the light, diffused by the light diffusing plate 15 by the respective processing, into the P-component in its entirety, while allowing only the light at an angle within a preset range with respect to the angle of field of view of the LCD panel 18 to be transmitted through the LCD panel 18.

The LCD panel 18 forms and demonstrates an image by controlling the direction of the liquid crystal, from pixel to pixel, based on signals from a signal line, not shown, to cause changes in the amount of transmission of the light emanated from the fluorescent tubes 13 and which is incident on the LCD panel 18 via light diffusing light guide plate 14, light diffusing plate 15, BEF sheet 16 and D-BEF sheet 17.

Figure 2:
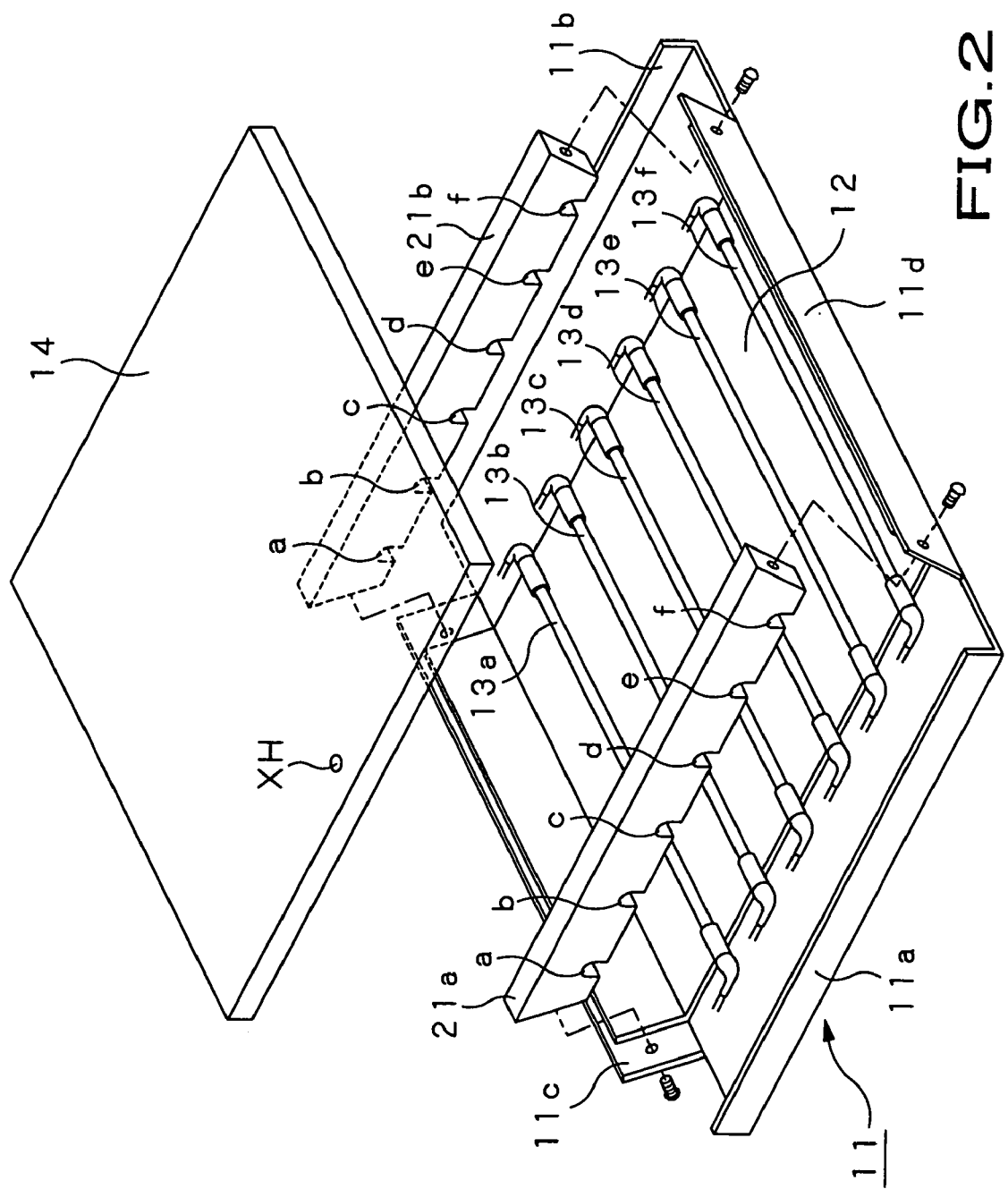
FIG. 2 is an exploded view showing the liquid crystal display apparatus shown in FIG. 1.

Referring to FIG. 2, depicting an exploded constructive view of the LCD of FIG. 2, the detailed structure of the LCD, embodying the present invention, will now be explained.

The back metal frame 11 is a housing formed by an aluminum plate of a substantially square saucer shape of a thin thickness. In more detail, the back metal frame 11 is provided with vanes 11a, 11b, bent upright along its long sides, and vanes 11c, 11d, bent upright along its short sides. The vanes 11c, 11d are bent obliquely at a preset angle with respect to the bottom surface. On both longitudinal sides of the back metal frame 11 are arranged fluorescent tube mounting plates 21a, 21b.

The fluorescent tube mounting plates 21a, 21b are formed so that their ends are angled for mating with the vanes 11c, 11d. These fluorescent tube mounting plates 21a, 21b are molded from a highly reflective plastics material. The edges of the fluorescent tube mounting plates, contacting with the back metal frame 11, are formed with recessed or hole-shaped mounting parts a to f for mounting the fluorescent tubes 13 in position. In FIG. 2, six fluorescent tubes 13a to 13f may be mounted in position. On terminal ends of the fluorescent tubes 13a to 13f, in register with the mounting parts a to f, there are mounted rubber caps to permit the fluorescent tube mounting plates 21 to be secured in position without application of excess load which might damage the fluorescent tubes 13.

Figure 3:
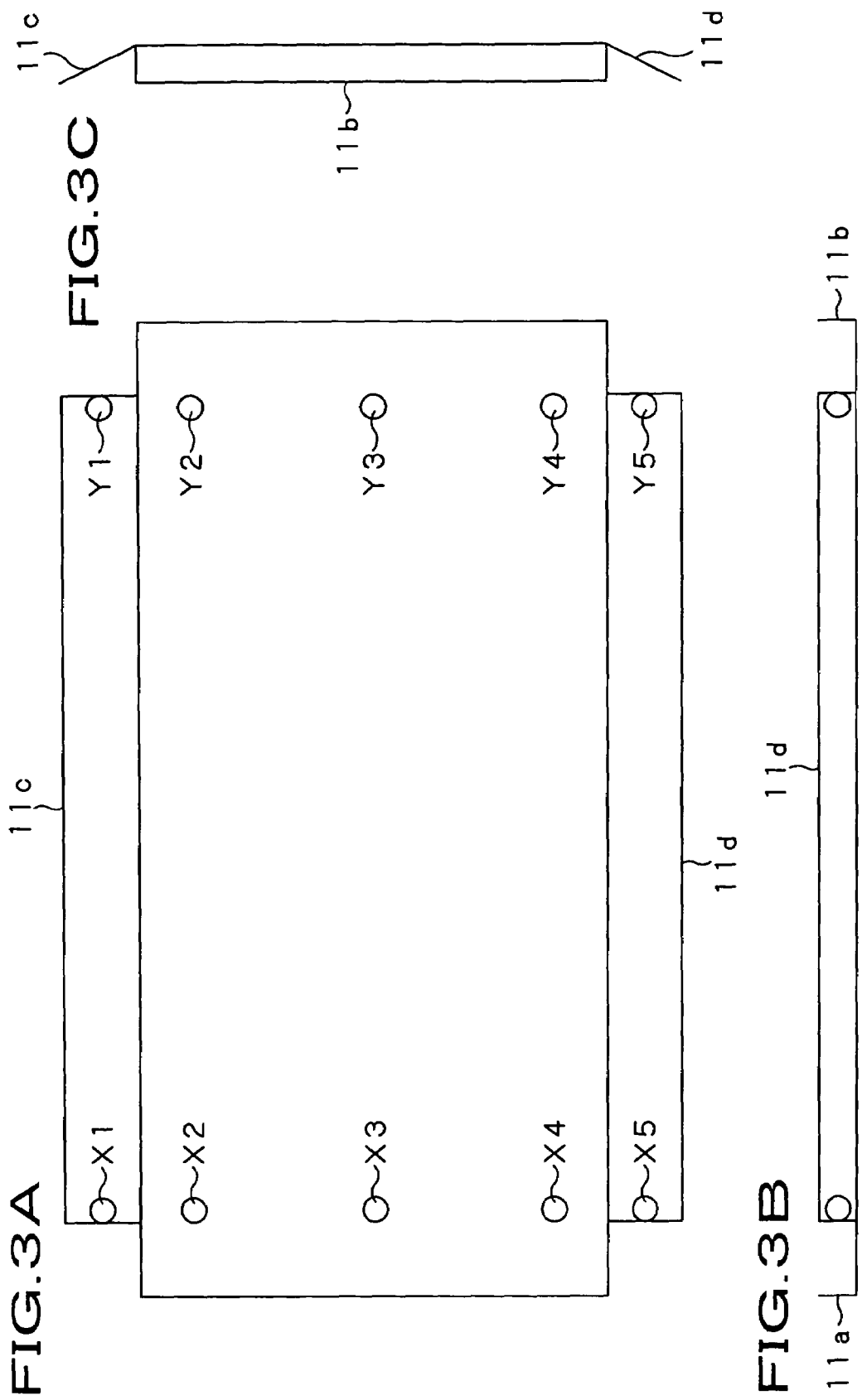
FIG. 3A is a plan view of a back metal frame of the liquid crystal display apparatus shown in FIG. 1A.
FIG. 3B is a side view showing the lower end of the back metal frame and FIG. 3C is a side view showing the rightmost end of the back metal frame.

On the inner surface of the back metal frame 11, the reflective sheet 12 is arranged, as described above. The fluorescent tubes 13a to 13f are arranged on the reflective sheet 12 side-by-side at a preset spacing from one another. Referring to FIG. 3, tapped holes X1 to X5 and tapped holes Y1 to Y5 are formed at the locations of the back metal frame 11 where there are mounted the fluorescent tube mounting plates 21. In the fluorescent tube mounting plates 21, there are formed openings, not shown, for tightening set screws, in register with the tapped holes. Meanwhile, FIG. 3A is a plan view of the back metal frame 11, FIG. 3B is a side view as seen from the lower end of the plan view of FIG. 3A and FIG. 3C is a side view as seen from the rightmost end of the same plan view.

Figure 4:
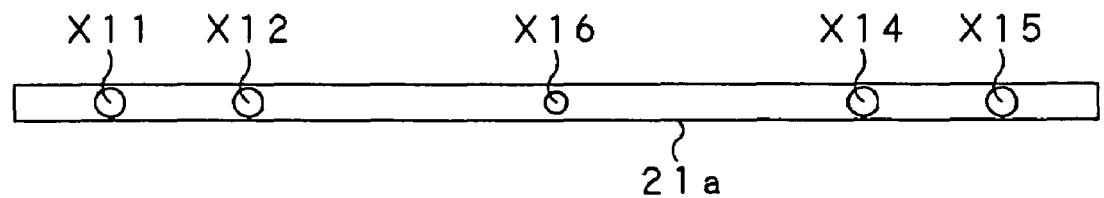
FIG. 4 illustrates a fluorescent tube mounting plate shown in FIG. 2.
Figure 5:
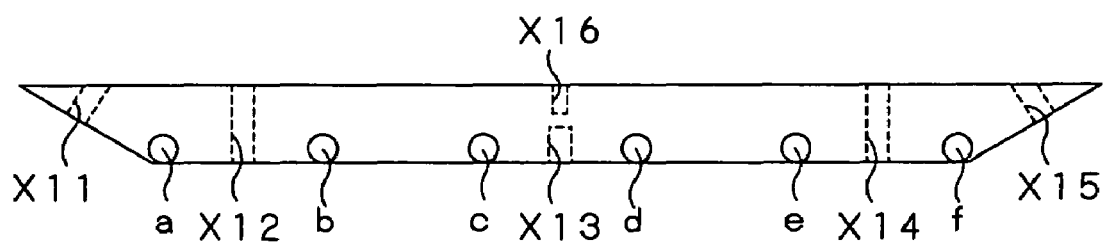
FIG. 5 illustrates a fluorescent tube mounting plate shown in FIG. 2.

FIGS. 4 and 5 are a plan view and a side view of the fluorescent tube mounting plate 21a, respectively. The fluorescent tube mounting plate 21a has mounting holes X11 and X15 and also has a hole X16 for mounting a positioning pin at a mid point in the left-and-right direction, towards an upper surface. Although not shown, the opposite side fluorescent tube mounting plate 21b is of a similar structure.

When the reflective sheet 12, fluorescent tubes 13a to 13f and the fluorescent tube mounting plates 21a, 21b are mounted in position, there is formed a housing, in which the top part of the set of fluorescent tubes 13 is opened. The light diffusing light guide plate 14 is arranged for closing the opening part of the housing, and the light diffusing plate 15, BEF sheet 16, D-BEF sheet 17 and the LCD panel 18 are mounted on top of the light diffusing light guide plate in this order.

Figure 6:
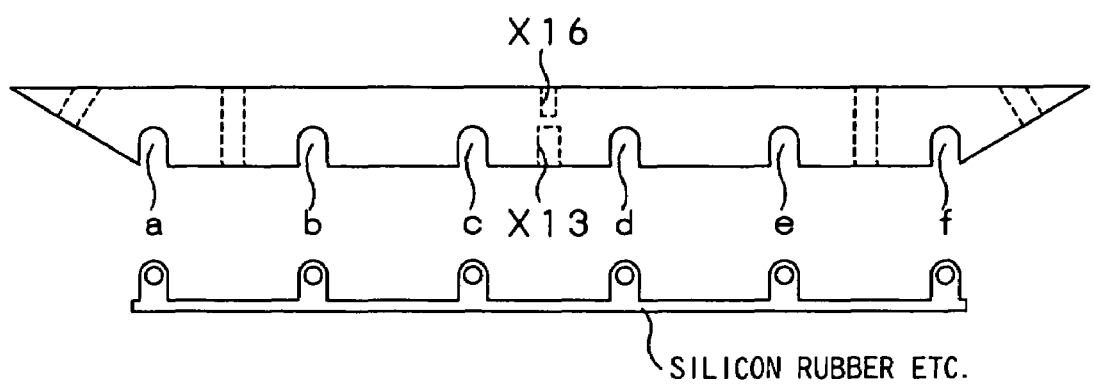
FIG. 6 illustrates a modification of the fluorescent tube mounting plate.
Figure 7:
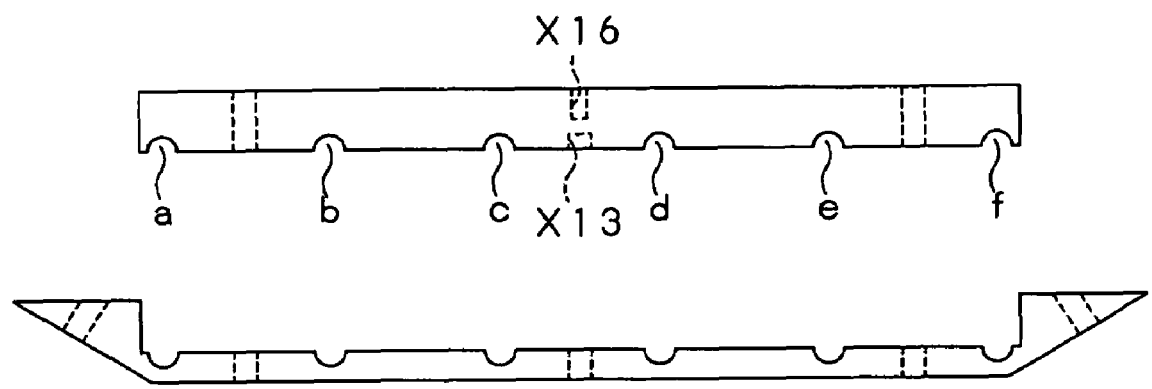
FIG. 7 illustrates a modification of the fluorescent tube mounting plate.
Figure 8:
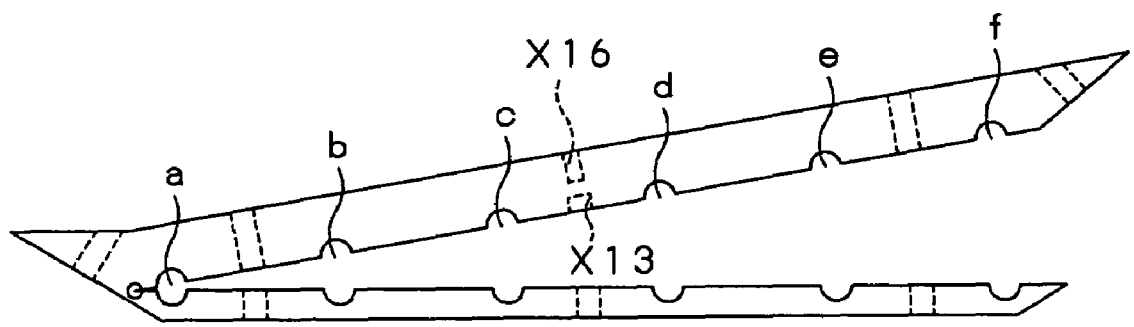
FIG. 8 illustrates a modification of the fluorescent tube mounting plate.

FIGS. 6 to 8 show an alternative embodiment of the fluorescent tube mounting plate 21a. Meanwhile, the parts or components similar to those of the fluorescent tube mounting plate 21a explained with reference to FIG. 3 are depicted by the same reference numerals and are not explained here specifically. In FIGS. 6 and 7, hole-shaped mounting parts a to f are split to permit the fluorescent tubes 13 to be clamped in the hole-shaped mounting parts combined together. In FIG. 6, the fluorescent tubes 13 are retained by rubber bushings and the fluorescent tube mounting plate 21a is formed with a U-shaped cut-out. The bushings, holding the ends of the fluorescent tubes 13, are thrust into these cut-outs. In FIG. 8, the fluorescent tube mounting plate is not completely split and includes a hinge. The fluorescent tube mounting plate 21b may be of a structure similar to that shown in FIGS. 6 to 8.

(Structure of a Printer)

Figure 9:
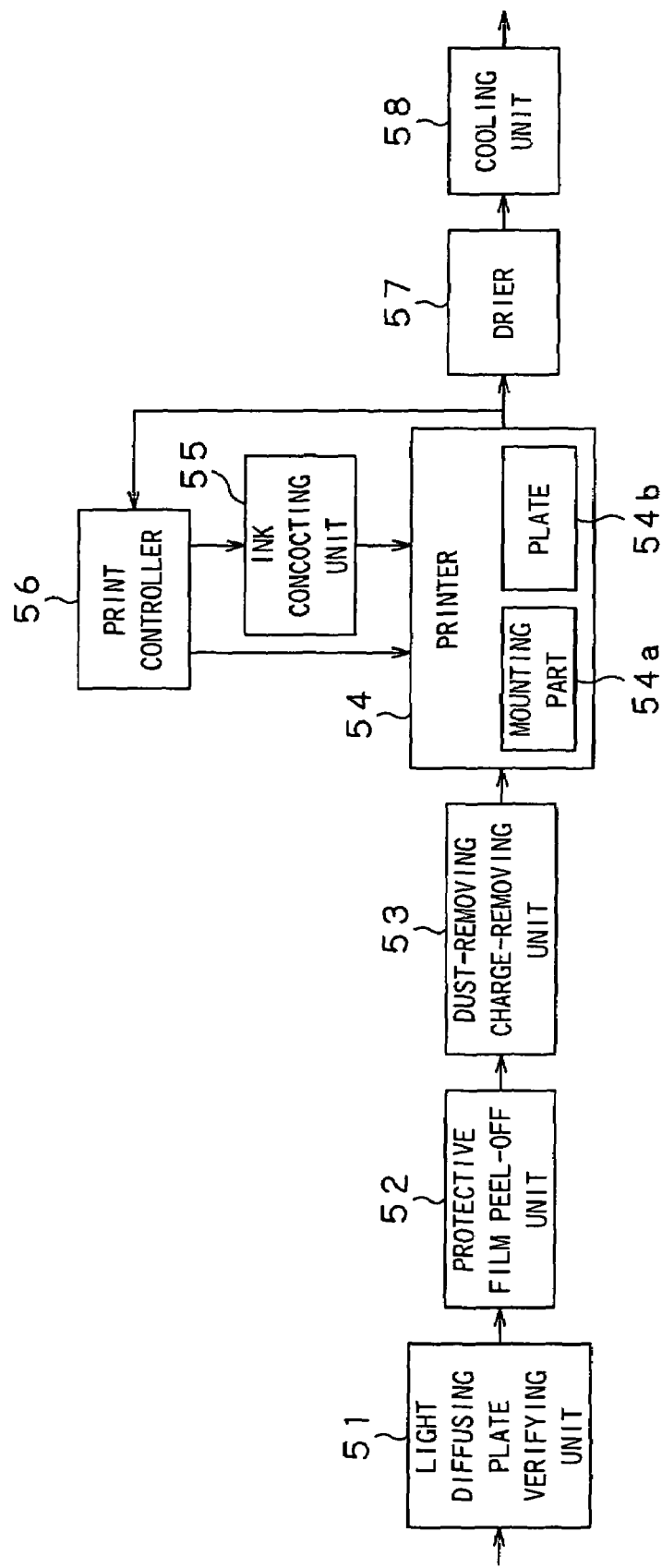
FIG. 9 is a block diagram showing the structure of a printer.

Referring now to FIG. 9, a printer for printing a dot pattern on the light diffusing plate 15 of FIG. 1 will be explained. It is noted that FIG. 9 shows an illustrative structure of a fully automated printer.

A light diffusing plate verifying unit 51 confirms the shape or size of the light diffusing plate 15, furnished as a feedstock material, and acts on the shape or size as necessary to send the resulting shape or size to a protective film peel-off unit 52. The protective film peel-off unit 52 peels off the protective film, used for protecting the surface of the material of the light diffusing plate 15 and which has been supplied from the light diffusing plate verifying unit 51, while adjusting the surface to a printable state.

A dust-removing charge-removing unit 53 removes dust, produced on peeling off a protective film, by removing charges, to send the resulting light diffusing plate 15 to a printer 54. Specifically, the light diffusing plate 15 is formed of an acrylic resin material, so that static charges are generated on peeling a surface protective film and hence dust and dirt are attracted to the surface. The dust-removing charge-removing unit 53 removes static charges generated on the light diffusing plate 15 to remove dust and dirt from the acrylic part.

The printer 54 prints a dot pattern on the surface of the light diffusing plate 15, supplied from the dust-removing charge-removing unit 53, in accordance with a fixed table slide system. Specifically, the printer 54 operates, under control by a print controller 56, to secure the light diffusing plate 15 by a mounting part 54a, formed by a fixed table (to secure the light diffusing plate as the clearance from a plate 54b or the position is set), to slide the plate 54b as the mounting part thrusts the plate from above and from below, to effect printing on the light diffusing plate 15, using an ink concocted by an ink concocting unit 55, and to send out the printed light diffusing plate 15 to a drier 57.

With the printing method of the fixed table slide system, the ink on the plate 54b may be stabilized, the ink may be charged easily to dots in the plate 54b and the pressure may be applied easily on the printing surface in the up-and-down direction and in the left-and-right direction. Printing is carried out in the longitudinal direction for the dot pattern. By this processing, the left and right sides of each dot may be equalized, while the ink may be suppressed from spreading. The method for generating the plate 54b will be explained later. The plate 54b herein means a so-called screen. The ink seeps out in accordance with a dot pattern printed on a screen, as a result of which the dot pattern is printed on a support.

The ink concocting unit 55 mixes a variety of starting materials (e.g. pharmaceuticals making up the ink), including a light shielding agent and a light diffusing agent, under control by the print controller 56, and sends the resulting mixture to the printer 54.

The light shielding agent may be enumerated by, for example, titanium oxide, barium sulfide, calcium carbonate, silicium carbide, alumina oxide, zinc oxide, nickel oxide, calcium hydroxide, cerium oxide, lithium sulfide, barium titanate, tri-iron tetroxide, methacrylic resin powders, mica (sericite), kaolin powders, kaolin, bentonite, silver powders, gold powders and pulp fibers.

The light diffusing agent may be enumerated by, for example, silicium oxide, glass beads, glass powders, glass fibers, liquid silicon, quartz powders, gold-plated resin beads, cholesteric liquid crystal solution or recrystallized acrylic resin powders.

The ink concocting unit 55 may add 0 to 7 wt % of an ultraviolet ray inhibiting agent and 0 to 1 wt % of an anti-foaming agent to the generated ink. The ultraviolet ray inhibiting agent is effective to prohibit ultraviolet rays, contained in the light radiated from the light source, while the anti-foaming agent is effective to suppress foaming in the ink by lowering the surface tension.

The print controller 56 is a so-called micro-computer, formed by a CPU (Central Processing Unit), a RAM (Random Access Memory), a ROM (Read-Only Memory), a keyboard and a variety of operating buttons. Specifically, the print controller detects misregistration or blurring in printing, from the printing state of the light diffusing plate 15, carrying the printed dot pattern, output from the printing unit 54, and sends the information controlling the position or the printing speed to the mounting part 54a, while generating and sending a signal controlling the proportions of concoction of the light shielding agent and the light diffusing agent to the ink concocting unit 55.

The drier 57 dries the ink of the dot pattern, printed on the light diffusing plate 15 by the printer 54, by an infra-red (IR) heater, and sends the so dried light diffusing plate 15 to a cooling part 58. The cooling part 58 cools the light diffusing plate 15 heated by the drier 57 and having printed thereon the dried dot pattern, to send out the completed light diffusing plate 15.

(Process for Printing a Light Dimming Dot Pattern by a Printer)

Referring to the flowchart of FIG. 10, the processing of printing a dot pattern on the light diffusing plate 15, using a printer explained with reference to FIG. 9, will be explained.

In a step S1, the light diffusing plate verifying unit 51 verifies the size or the shape of the light diffusing plate 15 to decide on whether or not the light diffusing plate 15 is of a preset size or shape. If the light diffusing plate is not of a preset size or shape, the light diffusing plate verifying unit acts on the light diffusing plate to process it to the preset shape and size to send the resulting light diffusing plate to the protective film peel-off unit 52.

In a step S2, the protective film peel-off unit 52 peels off the protective film, used for protecting the surface of the light diffusing plate 15, and which has been supplied from the light diffusing plate verifying unit 51, in order to adjust the surface to a printable state, and sends the so adjusted light diffusing plate 15 to the dust-removing charge-removing unit 53.

In a step S3, the dust-removing charge-removing unit 53 removes static charges, deposited on the surface of the light diffusing plate 15, by e.g. static electricity generated on peeling off the protective film, and sends the resulting light diffusing plate to the printer 54.

In a step S4, the mounting part 54a of the printer 54 immobilizes the light diffusing plate 15, sent from the dust-removing charge-removing unit 53, at a preset position, based on a signal supplied from the print controller 56.

In a step S5, the print controller 56 decides on whether or not the current printing is the first printing. If it is determined that the current printing is the first printing, processing transfers to a step S6.

If, in the step S5, the print controller 56 has determined that the printing is not the first printing, processing transfers to a step S11. Specifically, if the current printing is not the first printing, that is, if the characteristic values have already been found, there is no necessity for performing the printing for finding out the characteristic values, or for doing idle printing after the end of various setting operations carried out based on the characteristic values. Hence, the steps S6 to S10, as later explained, are skipped.

In a step S6, the mounting part 54a of the printer 54 adjusts the gap between the plate 54b and the light diffusing plate 15, as a support, based on a signal supplied from the print controller 56.

In a step S7, the ink concocting unit 55 concocts a variety of starting materials for the ink, inclusive of the light shielding agent, and the light diffusing agent, based on the signals supplied from the print controller 56, in accordance with a preset mixing ratio, and sends the resulting mixture to the printer 54. The mixing ratio is optional.

In a step S8, the printer 54 effects printing for establishing characteristic conditions, by thrusting the plate 54b. At this time, the print controller 56 finds the conditions for printing, such as the printing speed or the amount of the ink, from the printing state of the support, carrying the print thereon, such as printing speed or the amount of the ink, in order to set the conditions optimum for printing.

In a step S9, the printer 54 executes idle printing, under conditions established based on characteristic conditions by the processing of the step S8. In this processing, the print controller 56 executes idle printing, until the ink seeps to the plate 54b in its entirety, that is, until blurring is removed, as account is taken of the printing state of the light diffusing plate 15 carrying the dot pattern printed thereon.

In a step S10, the print controller 56 verifies the printing state and, when it is determined that the printing state is good, that is, if it has been determined that no blurring or offsetting has occurred, processing transfers to a step S11 to initiate regular printing. If the print controller 56 has verified that the printing state is not that good, processing reverts to the step S9 to exercise control to repeat idle printing.

In the step S11, the print controller 56 exercises control to initiate regular printing of printing a dot pattern for light dimming on the light diffusing plate 15. At this time, the ink printing operation is repeated a number of times until a film thickness is such that the light shielding properties by the light dimming dot pattern formed on printing are sufficient and the desired transmittance of all light rays may be achieved.

Specifically, with the initial printing, a light dimming dot pattern with a film thickness only on the order of 5 µm is achieved, so that, if printing is done with white ink, for example, sufficient light shielding properties cannot be achieved, such that color irregularities cannot be removed. Hence, printing is effected twice or thrice to form a light dimming dot pattern on the order of 12 µm which will yield sufficient light shielding properties.

In printing a light dimming dot pattern, using a gray colored ink (silver colored ink) having high concentration of black color ink, sufficient light shielding properties may be obtained with a film thickness of the order of 5 µm, so that one printing operation suffices.

Although sufficient light shielding properties may be provided by controlling the film thickness, that is, the number of times of printing, responsive to the type of the ink used, it is also possible to achieve desired light transmittance for all light rays using inks of different types. For example, white ink is used for the first printing and gray color ink is used for the second printing, which is an overlay printing, to form a light dimming dot pattern. If printing is carried out a plural number of times, using different inks from one printing operation to another, it is possible to achieve fine adjustment of the light transmittance for all light rays that could not be achieved by overlay coating with the same type ink.

In a step S12, the drier 12 dries the light diffusing plate 15, carrying the dot pattern, printed thereon, and sends the so dried light diffusing plate 15 to the cooling unit 58.

In a step S13, the cooling unit 58 cools the light diffusing plate 15, which has fully been dried, and sends out the so dried plate as the light diffusing plate 15.

By the above processing, the processing for assuring an optimum printing state as the characteristic conditions are finally determined is carried out by the processing steps from S6 to S10. The light diffusing plate 15, printed at this time, is likely to fail to play the role of the light diffusing plate because the dot pattern is not impeccable. Consequently, the light diffusing plate 15, printed at this time, cannot be used as a product, and hence no support for a test needs to be used until regular printing is initiated.

After the dot pattern has been printed by the above processing on the light diffusing plate 15, optical characteristic values thereof are measured for checking whether or not the light diffusing plate meets the optically required design parameters. A lighting test is then conducted for checking whether or not there is any grazing on the surface, or rust has become affixed to the surface. The light diffusing plate 15, which has passed the test, is packaged for shipment.

In the above explanation, the totality of the processing operations is carried out by the printer explained in FIG. 9.

However, the various processing operations need not necessarily be carried out by the configuration shown in FIG. 9, but may be implemented manually. Thus, the processing operations, explained with reference to the flowchart of FIG. 10, may be said to show the process of printing a dot pattern.

(Structure of Plate Generating Device)

Figure 11:
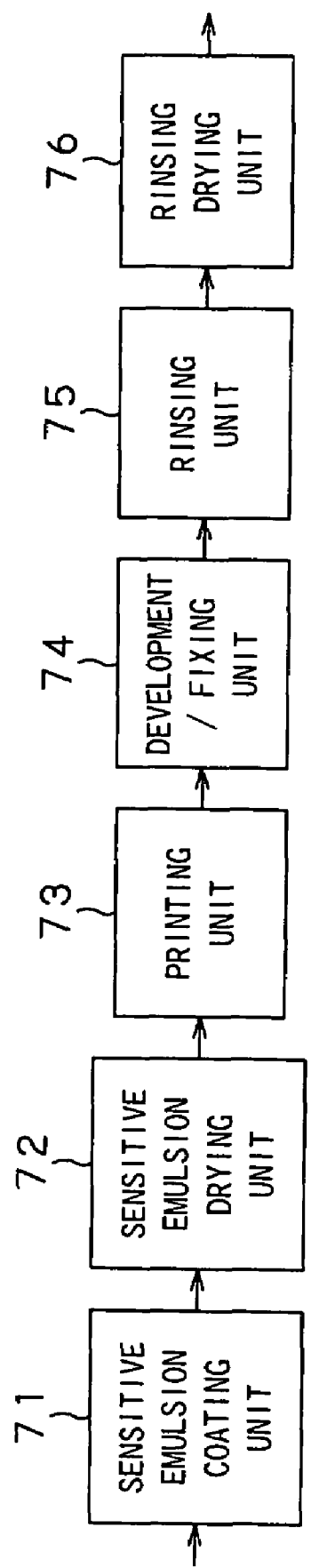
FIG. 11 is a block diagram showing the structure of a plate generating device.

Referring to FIG. 11, a plate generating apparatus, for generating a plate 54b of the above-described printer, will be explained.

A sensitive emulsion coating unit 71 coats a plate 54b, comprised of a screen, with a sensitive emulsion, and sends the plate 54b, coated with the sensitive emulsion, to a sensitive emulsion drying unit 72. This sensitive emulsion drying unit 72 dries the sensitive emulsion of the plate 54b, coated with the sensitive emulsion, supplied from the sensitive emulsion coating unit 71, and sends the so dried sensitive emulsion to a printing unit 73.

The printing unit 73 prints a dot pattern on the plate 54b, coated with the sensitive emulsion, using a film, set to the preset dot pattern, and sends the plate 54b, having the dot pattern printed thereon, to a development/fixing unit 74.

The development/fixing unit 74 develops and fixes the sensitive emulsion of the plate 54b, having the dot pattern printed thereon, to send the so developed and fixed sensitive emulsion to a rinsing unit 75. The rinsing unit 75 rinses the plate 54b, having the dot pattern fixed in a printed state, using a preset rinse liquid, and sends the so rinsed plate 54b to a rinsing drying unit 76.

The rinsing drying unit 76 dries the rinsing liquid, used for rinsing the plate 54b, having printed thereon the dot pattern, supplied from the rinse unit 75, to send out the resulting plate as a completed plate 54b.

(Plate Generating and Processing Step by a Plate Generating Device)

Figure 12:
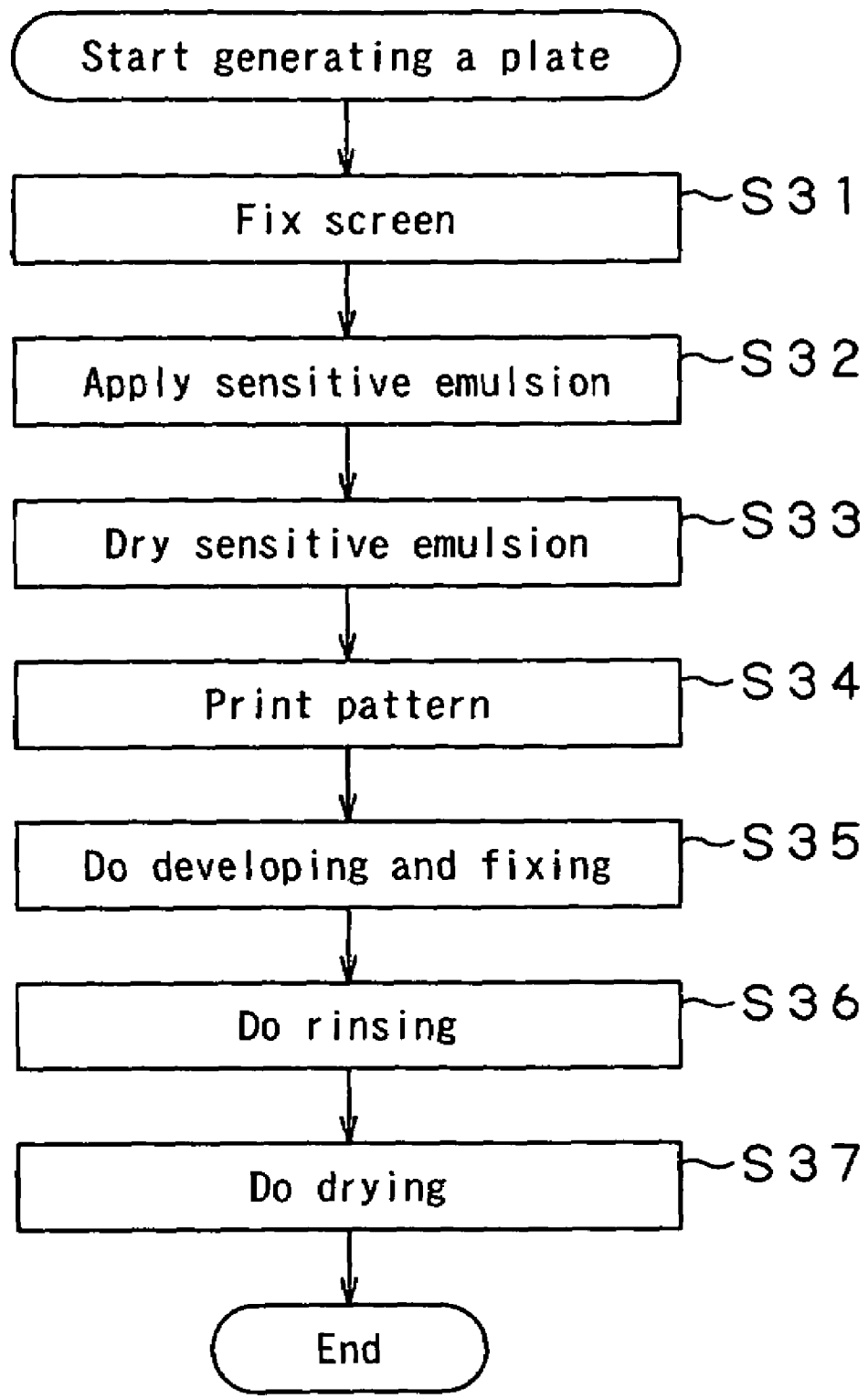
FIG. 12 is a flowchart for illustrating the processing for generating a plate by the plate generating device of FIG. 11.

Referring to the flowchart of FIG. 12, the processing of generating and processing the plate by the plate generating device of FIG. 11 is explained.

In a step S31, the sensitive emulsion coater 71 immobilizes the plate 54b (screen) and, in a step S32, the sensitive emulsion coater applies a sensitive emulsion and sends the plate 54b, coated with the sensitive emulsion, to the sensitive emulsion drying unit 72.

In a step S33, the sensitive emulsion drying unit 72 dries the plate 54b, coated with the sensitive emulsion, and sends the so dried plate to the printing unit 73.

In a step S34, the printing unit 73 prints a preset dot pattern on the plate 54b, using a film carrying the preset dot pattern, and sends the resulting preset dot pattern to the development/fixing unit 74.

In a step S35, the development/fixing unit 74 develops and fixes the plate 54b, having the dot pattern printed thereon, and sends the resulting plate 54b to a rinsing unit 75.

In a step S36, the rinsing unit 75 rinses off the development liquid and the fixing liquid, affixed to the plate 54b supplied from the development/fixing unit 74, using a preset rinsing liquid, and sends the resulting plate to a rinsing drying unit 76.

In a step S37, the rinsing drying unit 76 dries the rinsing liquid, used for rinsing the plate 54b and which has become affixed during the rinsing.

By the above processing, the plate 54b, having the dot pattern printed thereon, is generated.

In the foregoing explanation, various processing operations are accomplished by the plate generating device shown in FIG. 11. However, the various processing operations need not necessarily be carried out by the configuration shown in FIG. 9, but may be implemented manually. Hence, the processing operations, explained with reference to the flowchart of FIG. 10, may be said to show the process of generating the plate 54b.

(Explanation on Light Dimming Dot Pattern)

Figure 13:
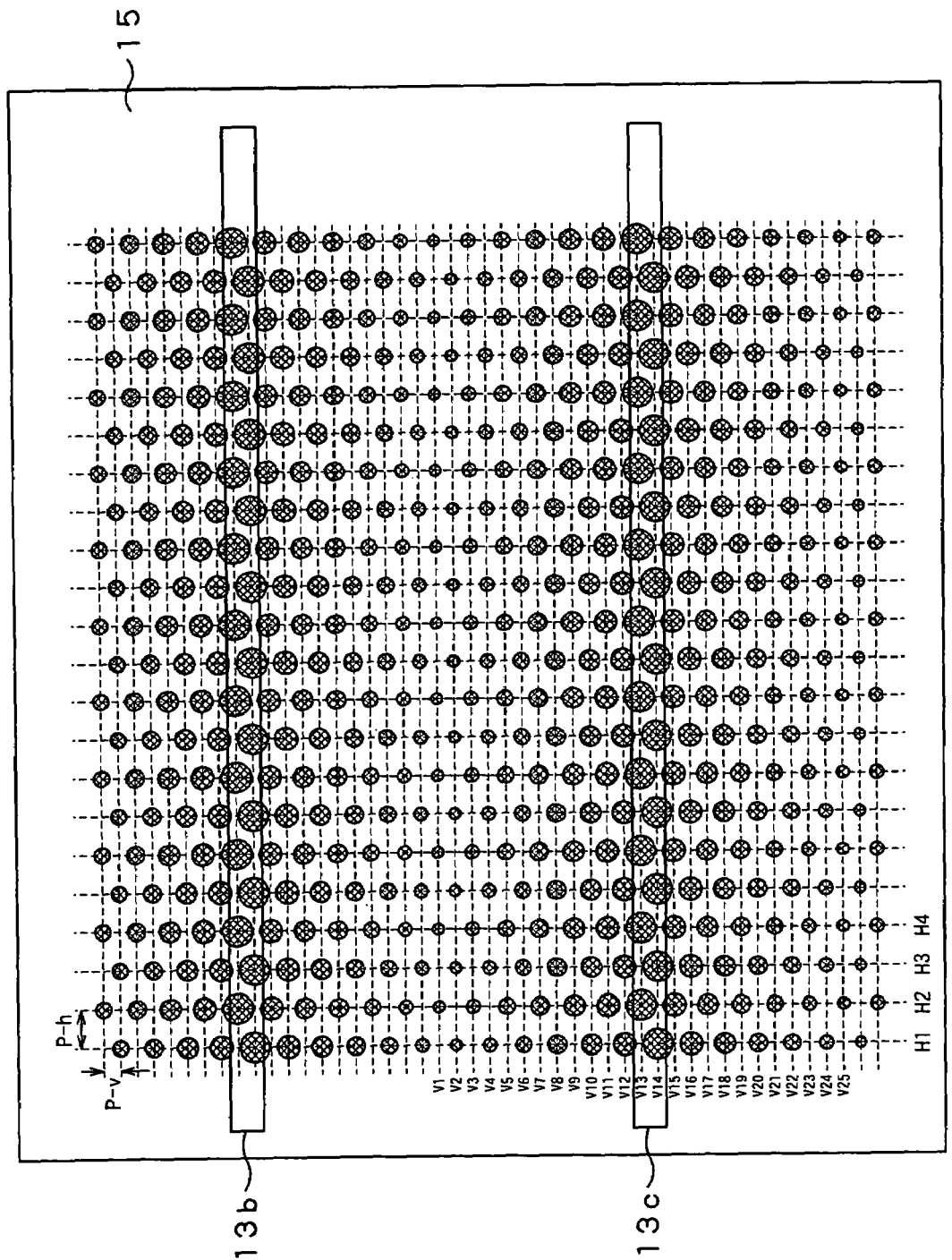
FIG. 13 shows a light dimming dot pattern when printing dots at the positions obtained on dividing the spacing between the fluorescent tube into 24 sections.

Referring to FIG. 13, the light dimming dot pattern, printed on the front or back surface of the light diffusing plate 15, is explained. Meanwhile, in FIG. 13, the horizontal direction of the light diffusing plate 15 is the direction along which are arrayed the fluorescent tubes 13. In FIG. 13, these fluorescent tubes 13b, 13c are shown.

The light dimming dot pattern, printed on the light diffusing plate 15, is determined in dependence upon the arraying spacing of the fluorescent tubes 13. Thus, the dots are arrayed in a staggered arrangement at locations resulting from division of the spacing between the fluorescent tubes 13 by 24 or 48. For example, in case the LCD is 23 inches, the arraying spacing between the fluorescent tubes 13 is on the order of 24 mm. Hence, in case the spacing is divided into 24 sections, the dot arraying spacing is 1 mm. Moreover, since the dots are arrayed in a staggered arrangement, the dots are arrayed at a spacing of 0.5 mm along the longitudinal direction of the fluorescent tubes 13.

That is, if, in a 23-inch LCD, the spacing between the fluorescent tubes 13 is divided by 24, the spacing P-v in the vertical direction in the drawing sheet is 1 mm, while the spacing P-h in the horizontal direction in the drawing sheet is 0.5 mm. In addition, the dots are arrayed every other row in each column, and the dots along the columns are arrayed in a staggered relation. Moreover, in FIG. 13, the dots are circular and are changed in diameter depending on the distance from the fluorescent tubes 13.

Figure 14:
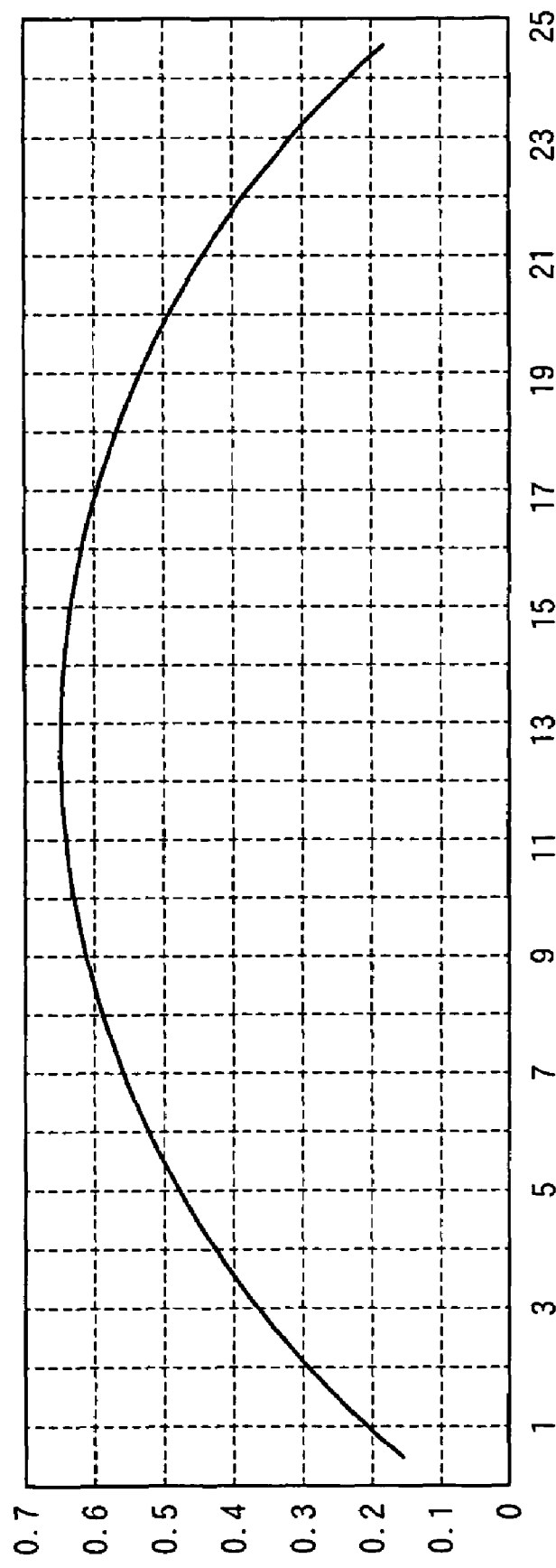
FIG. 14 illustrates changes in diameter of the dots of FIG. 13.

For example, the dots are varied in diameter as shown in FIG. 14. In this figure, the abscissa and the ordinate denote the positions along the vertical direction and the dot diameter (mm), respectively. In more detail, if the positions of the dots of FIG. 13 are specified by (columns, rows), the diameter of the dot at a position specified by (H2, V1) is approximately 0.16 mm, and that of the dot at a position specified by (H1, V2) is approximately 0.25 mm. In similar manner, the dot diameters at (H2, V3), (H1, V4), (H2, V5), (H1, V6) (H2, V7), (H1, V8), (H2, V9), (H1, V10) (H2, V11), (H1, V12), (H2, V13), (H1, V14) (H2, V15), (H1, V16), (H2, V17) (H1, V18) (H2, V19), (H1, V20), (H2, V21), (H1, V22) (H2, V23), (H1, V24) and (H2, V25) are approximately 0.3 mm, approximately 0.37 mm, approximately 0.42 mm, approximately 0.48 mm, are approximately 0.52 mm, approximately 0.56 mm, approximately 0.58 mm, approximately 0.61 mm, approximately 0.62 mm, approximately 0.64 mm, approximately 0.65 mm, approximately 0.64 mm, are approximately 0.62 mm, approximately 0.61 mm, approximately 0.59 mm, approximately 0.56 mm, approximately 0.53 mm, approximately 0.48 mm, approximately 0.44 mm, approximately 0.38 mm, approximately 0.32 mm, approximately 0.25 mm, and approximately 0.17 mm, respectively. By changing the dot diameters from approximately 0.16 mm to approximately 0.65 mm, depending on the distance from the fluorescent tubes 13, such a light dimming dot pattern is generated which increases or decreases the light volume to be shielded at a position close to a position directly above the fluorescent tubes 13 or at a position remoter from the fluorescent tubes 13, respectively.

Thus, by changing the dot diameters every other row in each column, based on the relationship as shown in the graph shown in FIG. 14, and by arranging the dots in a staggered relationship in the column direction, or in the vertical direction, based on the relationship as shown in the graph of FIG. 14, the light transmittance for the totality of light rays is 62%.

It is noted that the dots are printed using an ink in which the light shielding agent and the light diffusing agent have been concocted to a concentration of 18 to 32 wt % and to a concentration of 3.0 to 4.5 wt %, respectively.

Figure 10:
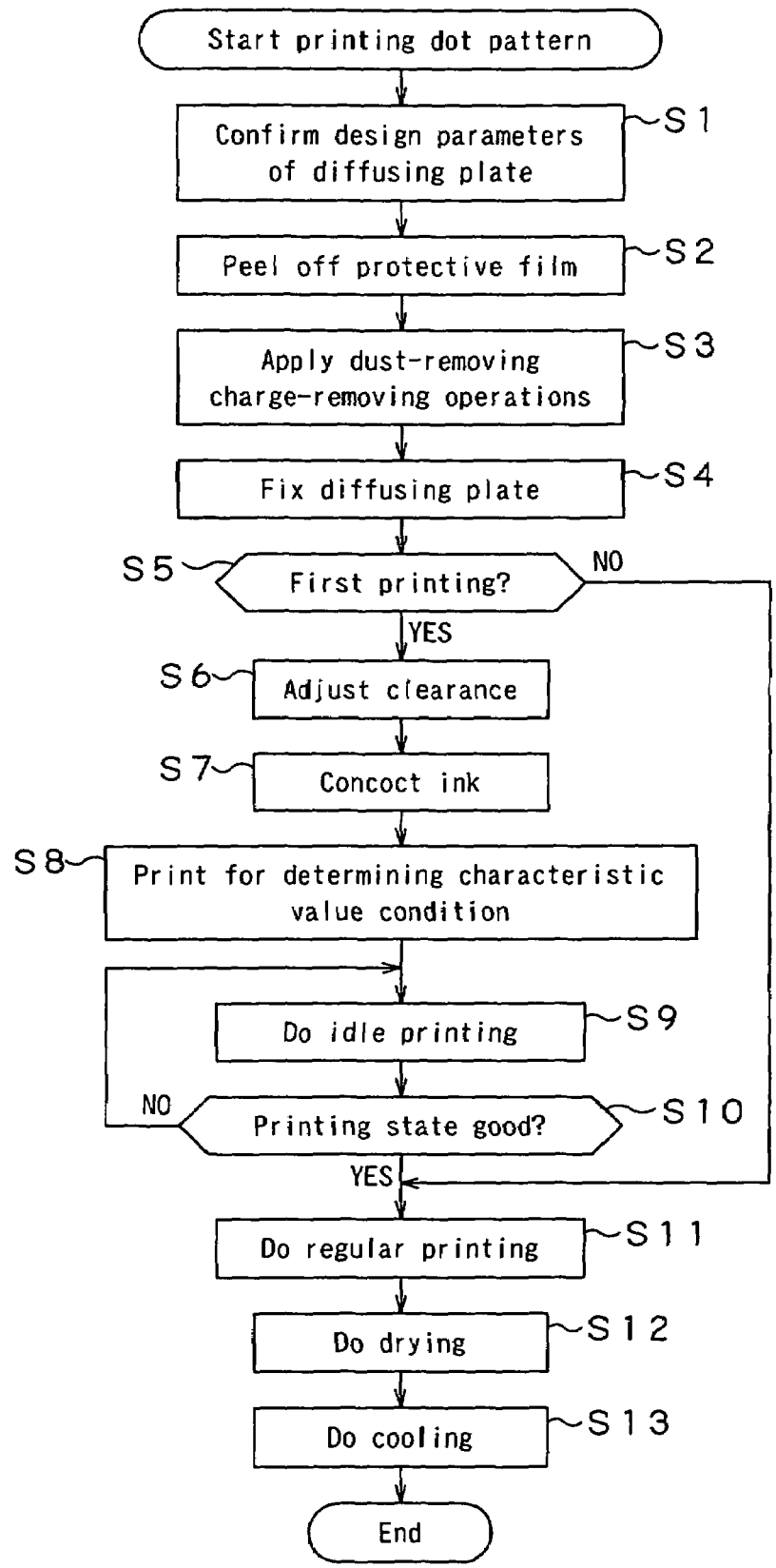
FIG. 10 is a flowchart for illustrating dot pattern printing processing by the printer of FIG. 9.

If, when the fluorescent tubes 13 are arranged at a spacing of, for example 24 mm, and the difference in luminance between the luminance at a location directly above the fluorescent tube 13 and that at a location partway between the neighboring fluorescent tubes 13 are each 700 to 1400 cd/m$^2$, the light dimming dot pattern, shown in FIG. 10, is provided, the difference in luminance between the luminance at a location directly above the fluorescent tube 13 and that at a location partway between the neighboring fluorescent tubes may be 500 cd/m$^2$ or less, such that the overall luminance may be raised to 7500 cd/m$^2$ from the value of 6400 cd/m$^2$ in the display system.

That is, the transmittance for all light rays may now be approximately 62% (roughly in the vicinity of 62%), which is higher than the conventional value not higher than 50%, such that equalized light of high luminance may be produced without raising the luminance of the fluorescent tubes 13. Moreover, it is possible to diminish the power in case the luminance remains the same, thus saving the power of the liquid crystal display as an ultimate product.

Moreover, by employing the above-described light dimming dot pattern, the difference in luminance between the luminance at a location directly above the fluorescent tube 13 and that at a location partway between the neighboring fluorescent tubes 13 may be 500 cd/m$^2$ or less, even though the distance between the fluorescent tubes 13 and the light diffusing light guide plate 15 is set to 0.7 mm or less, so that the LCD may be formed to a thinner thickness.

The transmittance for all light rays (opening ratio) of the dot pattern is set by measuring the luminance at plural points at a preset spacing between the fluorescent tube 13 on the LCD panel 18 (for example, 72 points between the fluorescent tubes 13) by a luminance measurement unit, for example, a unit manufactured by Topcon Co. Ltd. under the trade name of BM-7, as the fluorescent tubes 13 emit light under preset current or voltage conditions, by measuring the difference in luminance, and by setting the transmittance for all light rays per unit area, in dependence upon the distance from the fluorescent tubes 13, such that the transmittance for all light rays will be smaller and larger as the fluorescent tube is approached and as the intermediate positions between the neighboring fluorescent tubes 13 is approached, respectively.

The foregoing explanation has been made of an embodiment in which the dot is circular in shape. However, the dot shape is not limited to a circle provided that the transmission for all light rays is varied in similar manner to the case where the dot shape is circular in dependence upon the dot area and upon the dot positions between the fluorescent tubes 13. For example, the dot shape may be elliptical or square and may also be symmetrical or non-symmetrical.

Also, the foregoing explanation has been made of an embodiment in which the spacing between the neighboring fluorescent tubes 13 is divided into 24 sections. However, the number of the sections, resulting from division, may be changed within a range from 24 to 48. In this case, the horizontal spacing P-h and the vertical spacing P-v between neighboring dots are varied within the ranges of 0.25 to 0.5 mm and 0.6 to 1 mm, depending on the number of the sections, resulting from division, respectively. That is, the dots are arranged in each column every other row and in a staggered relationship in the vertical direction, with the spacing between neighboring dots being 0.5 to 1 mm in the horizontal direction and 1.2 to 2 mm in the vertical direction.

Figure 15:
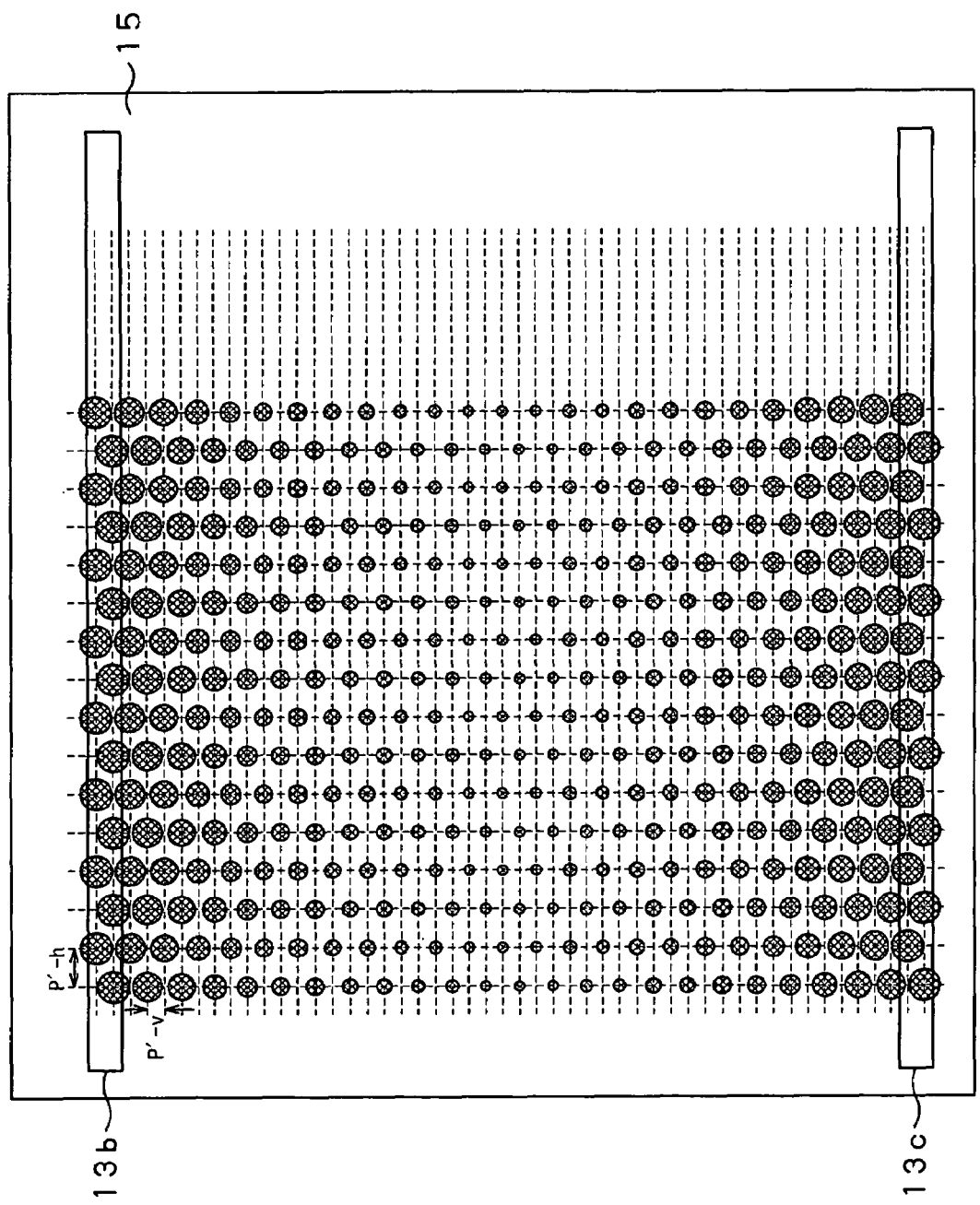
FIG. 15 shows a light dimming dot pattern when printing dots at the positions obtained on dividing the spacing between the fluorescent tube into 48 sections.

FIG. 15 shows a light dimming dot pattern in case the LCD size is 23 inches and the spacing between neighboring fluorescent tubes 13 is divided into 48 sections.

FIG. 15 shows the case in which the LCD size is 23 inches and the spacing between neighboring fluorescent tubes 13 is divided into 48 sections. The vertical spacing P'-v in the vertical direction and the horizontal spacing P'-h in the horizontal direction are 0.6 mm and 0.25 mm, respectively.

In the case of FIG. 15, the dot diameter is changed in a range substantially from 0.2 mm to 0.4 mm, depending on the distance from the fluorescent tubes 13, such as to increase the volume of shielded light at a position close to a position directly overlying the fluorescent tube 13 and to decrease the volume of shielded light at a position remoter from the fluorescent tube 13. Moreover, the dots are arranged in the staggered relationship along the column direction. In this manner, the transmittance for all light rays amounts to 70%.

The result is that, if the fluorescent tubes 13 are arranged at an spacing of 24 mm, and the difference in luminance between the luminance at a position directly overlying the fluorescent tube 13 and the luminance at a position partway between the neighboring fluorescent tubes 13 is 700 to 1400 cd/m$^2$, the difference in luminance between the luminance at the position directly overlying the fluorescent tube 13 and that at the position partway between the neighboring fluorescent tubes 13 may be 500 cd/m$^2$ or less, by providing the light diffusing light guide plate 15 with the light dimming dot pattern, as shown in FIG. 15. Hence, the overall luminance may be 7900 cd/m$^2$, as compared to the overall luminance of 6700 cd/m$^2$ in the conventional display system.

That is, the transmittance for all light rays is approximately 70% (roughly in the vicinity of 70%), which is higher than the usual value not higher than 50%, so that equalized light of high luminance may be produced without raising the luminance of the fluorescent tubes 13. Moreover, the power may be diminished in case the luminance remains the same, thus saving the power of the liquid crystal display as an ultimate product.

Moreover, the division of the spacing between the neighboring fluorescent tubes 13 is not limited to division into 24 sections or 48 sections as described above and may be division into an optional number of sections between 24 and 48. In case the spacing between the neighboring fluorescent tubes 13 is divided into 30 sections, the division interval, corresponding to the width of each section, is 0.8 mm. On the other hand, the interval between the dots printed along the length of the fluorescent tube is 0.4 mm.

By changing the dot diameters from approximately 0.4 mm to approximately 0.8 mm, in the case of division into 30 sections, depending on the distance from the fluorescent tubes 13, the light volume to be shielded may be increased or decreased at a position close to a position directly above the fluorescent tubes 13 or at a position remoter from the fluorescent tube 13, respectively. Moreover, by arranging the dots in the staggered relationship in the vertical direction, the transmittance for all light rays is 66%.

The result is that, when the fluorescent tubes 13 are arranged at a spacing of, for example 24 mm, the difference in luminance between the luminance at a location directly above the fluorescent tube 13 and that at a location partway between the neighboring fluorescent tubes 13 is 700 to 1400 cd/m², and there is provided the light dimming dot pattern, in which the spacing between the neighboring fluorescent tube 13 is divided into 30 sections, the difference in luminance between the luminance at a location directly above the fluorescent tube 13 and that at a location partway between the neighboring fluorescent tubes may be 500 cd/m² or less, such that the overall luminance may be 7700 cd/m² in contrast to the value of 6550 cd/m² in the conventional display system.

That is, the transmittance for all light rays is approximately 66% (roughly in the vicinity of 66%), which is higher than the usual value not higher than 50%, so that equalized light of high luminance may be produced without raising the luminance of the fluorescent tubes 13. Moreover, the power may be diminished in case the luminance remains the same, thus saving the power of the liquid crystal display as an ultimate product.

Thus, by varying the dot diameter of the dot pattern in a range from 0.16 to 0.7 mm, depending on the distance from the fluorescent tube, and by arranging the dots at the positions resulting from division of the spacing between the neighboring fluorescent tubes 13 into 24 to 48 sections, the transmittance for all light rays in the direction of light radiation from the fluorescent tube may now be approximately 62 to 71%, so that equalized light of high luminance may be produced without raising the luminance of the fluorescent tubes 13. Moreover, the power may be diminished in case the luminance remains the same, thus saving the power of the liquid crystal display as an ultimate product.

Thus, with the liquid crystal display apparatus, shown as a first embodiment of the present invention, in which the light dimming dot pattern is printed on the light diffusing plate 15, provided to the backlight device, having a cold cathode ray tube, which is a linear light source, as light source, the illuminating light, radiated in planar light emission, may be equalized in luminance without raising the power of the light source, that is, without raising the power usage.

The light dimming dot pattern, thus printed on the light diffusing plate 15, may similarly be printed on the light diffusing light guide plate 14, with favorable results equivalent to those in case the light dimming dot pattern is printed on the light diffusing plate 15. Furthermore, similar favorable results may be obtained when the light dimming dot pattern is printed on both the light diffusing light guide plate 14 and the light diffusing plate 15.

Second Embodiment (Light Source Being a Light Emitting Diode)

A liquid crystal display apparatus, shown as a second embodiment of the present invention, will now be explained.

(Structure of the Liquid Crystal Display Apparatus)

Figure 16:
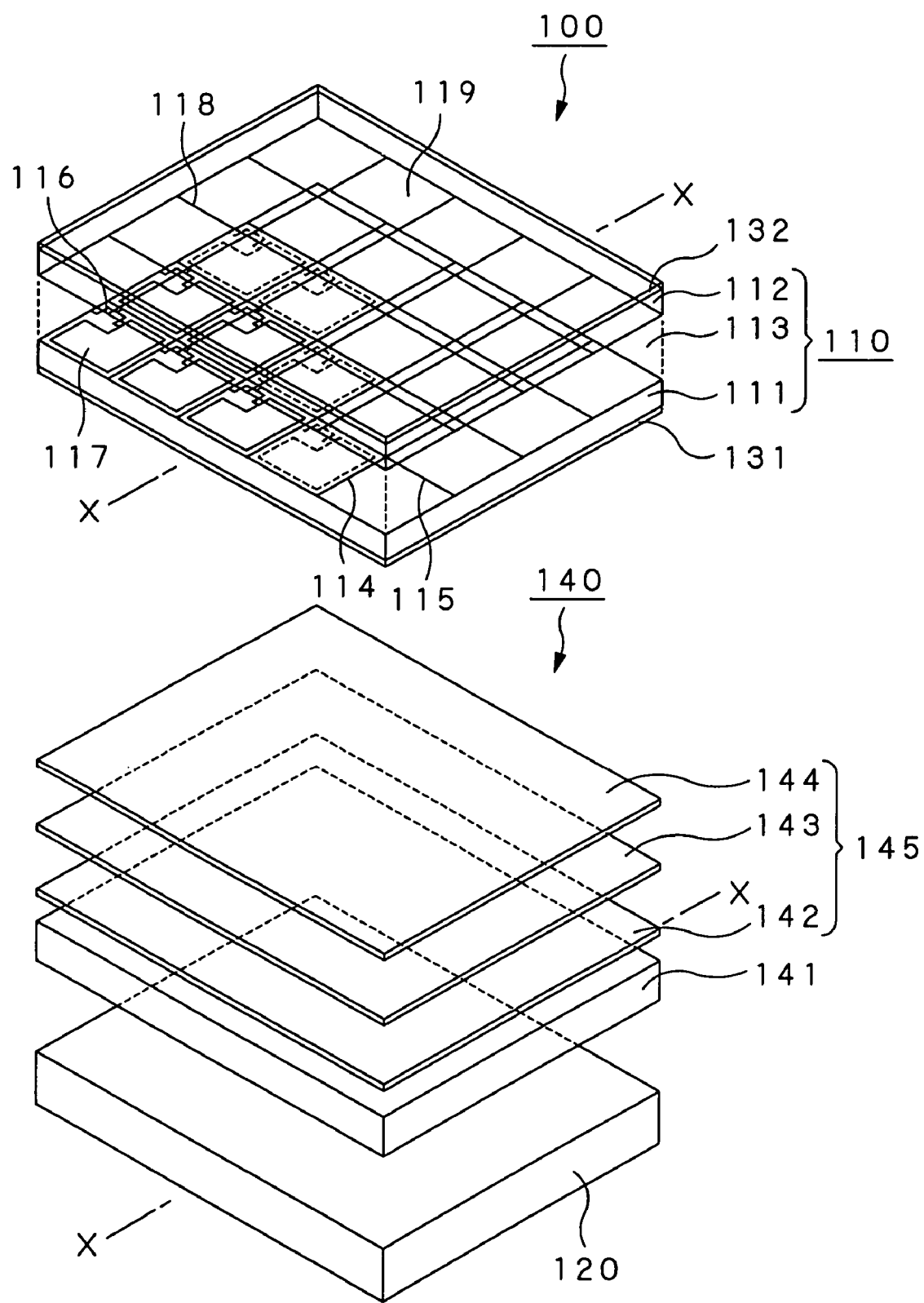
FIG. 16 illustrates the structure of a liquid crystal display apparatus shown as a second embodiment of the present invention.

A liquid crystal display apparatus 100, shown as a second embodiment in FIG. 16, uses a light emitting diode, which is a point light source, as a light source for a subjacent backlight device 140.

The light transmitting liquid crystal display apparatus 100 is made up by a light transmitting liquid crystal display panel 110, and the backlight device 140, arranged on the back surface of the liquid crystal display panel 110. This liquid crystal display panel 110 also includes a receiver, such as analog or digital tuner, receiving ground waves or satellite waves, a picture signal processor and an audio signal processor for processing picture signals and audio signals, captured by the receiver, or an audio signal outputting unit, such as a loudspeaker, for outputting audio signals processed by the audio signal processor.

The light transmitting liquid crystal display panel 110 is made up by two transparent substrates (a TFT substrate 111 and a counter electrode substrate 112), formed of glass, mounted facing each other, and a liquid crystal layer 113 of, for example, twisted nematic (TN) liquid crystal, enclosed in a spacing between the two substrates. On the TFT substrate 111, there are formed signal lines 114, scanning lines 115, thin-film transistors 116, as switching elements, arranged at the points of intersection of the signal lines 114 and the scanning lines 115, and pixel electrodes 117. The thin-film transistors 116 are sequentially selected by the scanning lines 115 to write picture signals supplied from the signal lines 114 in associated pixel electrodes 117. On the inner surface of the counter electrode substrate 112 are formed a counter electrode 118 and a color filter 119.

With the liquid crystal display apparatus 100, the above-described light transmitting liquid crystal display panel 110 is sandwiched between two polarizing plates 131, 132 and driven in accordance with an active matrix system, as the panel is illuminated from its back side with white light by the backlight device 140, in order to display a desired full-color image.

The backlight device 140 illuminates the liquid crystal display panel 110 from its back surface side. Referring to FIG. 16, the backlight device 140 includes, in a backlight enclosure 120, having a built-in light source, not shown here, and the functions of mixing the light from the light source into white light, a set of optical sheets 145, made up by a light diffusing plate 141, a light diffusing sheet 142, overlaid on the light diffusing plate 141, a prism sheet 143 and a polarized light converting sheet 144. The light diffusing plate 141 equalizes the luminance in planar light radiation by inner diffusion of light radiated from the light source. The set of optical sheets 145 uplifts the white light, radiated from the light diffusing plate 141, along the direction of a normal line to the light diffusing plate 141, thereby elevating the luminance in planar light radiation.

Figure 17:
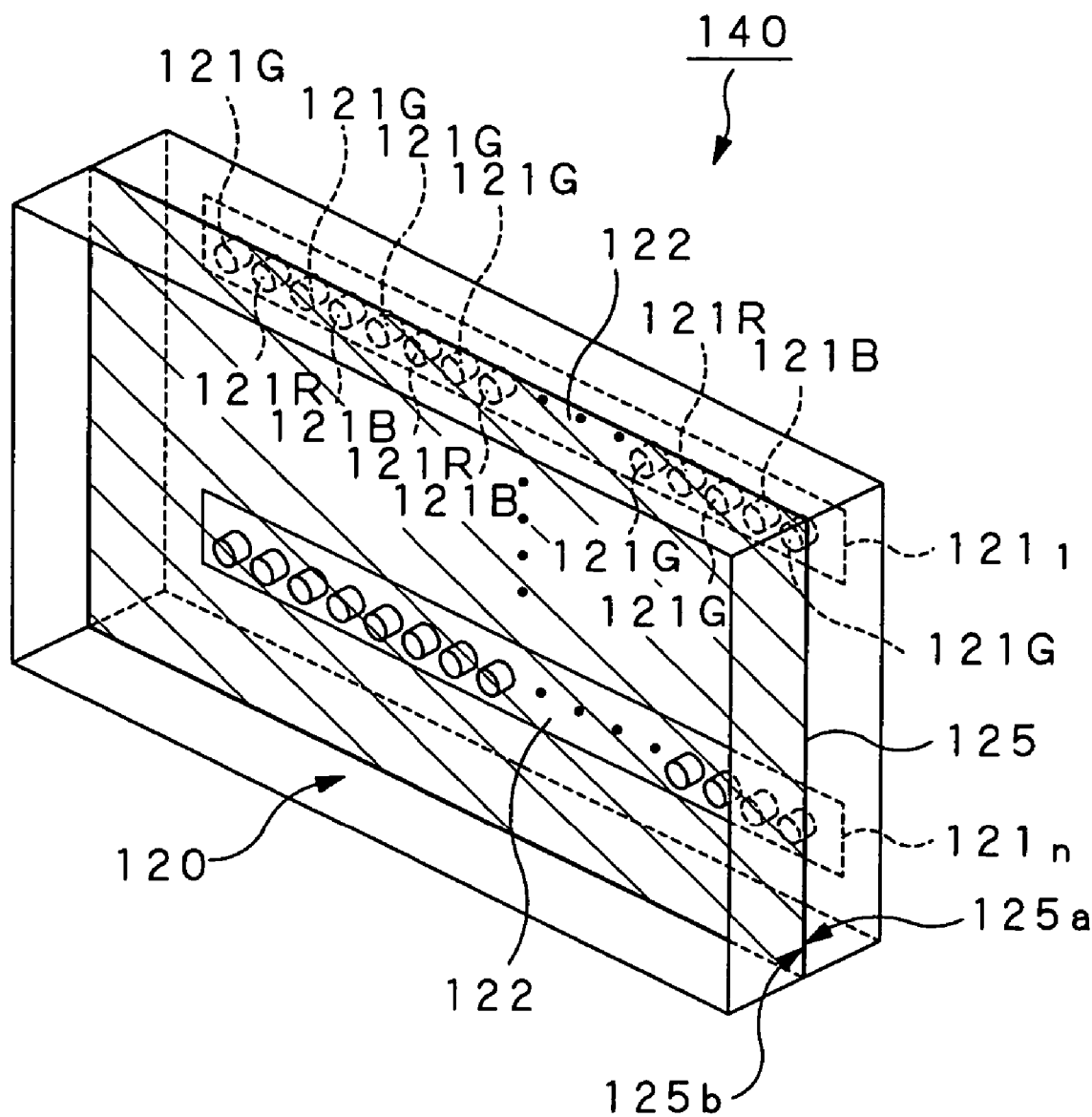
FIG. 17 illustrates a schematic structure of a backlight device provided to the liquid crystal display apparatus.

FIG. 17 schematically shows the structure within the backlight enclosure 120. Referring to FIG. 17, there are provided a light emitting diode 121R, emitting red light, a light emitting diode 121G, emitting green light, and a light emitting diode 121B, emitting blue light, as light sources in the backlight enclosure 120. In the following explanation, when the light emitting diodes 121R, 121G and 121B are termed collectively, these are simply termed a light emitting diode.

Referring to FIG. 17, the light emitting diodes 121 are arrayed in a string in a desired sequence on a substrate 122 to constitute a light emitting diode unit 121$n$, n being a natural number. The arraying sequence of the respective light emitting diodes 121 on the substrate 122 is a repetition of sets of four light emitting diodes 121, namely a green light emitting diode 121G, a red light emitting diode 121R, a green light emitting diode 121G and a blue light emitting diode 121B, in this order, as shown in FIG. 17. Stated differently, the red light emitting diodes 121R and the blue light emitting diodes 121B are alternately arranged between neighboring green light emitting diodes 121G arranged at a fixed spacing from one another.

The arraying sequence of the light emitting diode units 121$n$ is not limited to the above sequence and any suitable sequence may be used provided that the sequence used allows the light illuminating the color liquid crystal display panel 110 to be turned into desired white light.

A plural number of the light emitting diode units 121n are arranged side-by-side within the backlight enclosure 120, depending on the size of the liquid crystal display panel 110 illuminated by the backlight device 140. The manner of arraying the light emitting diode units 121n in the backlight enclosure 120 may be such that the longitudinal direction of the light emitting diode units 121n is the horizontal direction, as shown in FIG. 17, or the vertical direction, in a manner not shown. Alternatively, the light emitting diode units 121n may be arrayed partly with the longitudinal direction of the light emitting diode units being the horizontal direction and partly with the longitudinal direction of the light emitting diode units being the vertical direction.

Meanwhile, the technique of arraying the light emitting diode units 121n in the horizontal direction or in the longitudinal direction is the same as that used for arraying the fluorescent tubes, so far used often as light sources of the backlight device, and hence the currently established design know-how may be used to reduce the cost or the time needed until the time the liquid crystal panel is completed.

The light beams, emanated from the red light emitting diode 121R, green light emitting diode 121G and the blue light emitting diode 121B, arranged as the light emitting diodes 121n in the backlight enclosure 120, are mixed together in the backlight enclosure 120 into white light. It is noted that lenses, prisms or reflective mirrors, for example, are arranged for the respective light emitting diodes 121 so that the red, green and blue light beams emanated from the respective light emitting diodes 121 will be evenly mixed in the backlight enclosure 120.

Referring to FIG. 17, there is also provided, within the backlight enclosure 120, a light diffusing light guide plate (diverter plate) 125 for mixing the red, green and blue light beams, radiated from the light emitting diodes 121, so that the light diffusing light guide plate 125 will overlie the light emitting diode unit 121n, operating as a light source.

The light diffusing light guide plate 125 is a member similar to the light diffusing light guide plate 14, provided on the backlight device, mounted to the liquid crystal display apparatus of the above-described first embodiment. In the present embodiment, employing the light emitting diodes, emitting three prime colors, as a light source, the light diffusing light guide plate has the color mixing function. The light diffusing light guide plate 125 is formed of, for example, PMMA (Polymethyl Methacrylate), PC (PolyCarbonate), PET (Polyethylene Terephthalate), polyolefin or glass, which will yield the cloud value of 70 to 93% and transmittance for all light rays of 50 to 93%, and diffuses the light radiated from the light emitting diodes 121 and the light reflected by a reflective sheet 126 as later explained.

On a light incident surface 125a or on a light radiating surface 125b of the light diffusing light guide plate 125, there is formed a light dimming dot pattern for improving the performance in mixing the red, green and blue light beams and for removing a lamp image ascribable to the light emitting diodes 121 as discussed in the preamble of the present description. This light dimming dot pattern has the functions similar to that of the light dimming dot pattern formed on the light diffusing plate 15 of the liquid crystal display apparatus, shown as the above-described first embodiment, and diffuses/reflects the light incident thereon. The light dimming dot pattern formed on this light diffusing light guide plate 125 will be explained later in detail.

A light diffusing plate 141, shown in FIG. 16, is a milk-white plate having a preset plate thickness of, for example, approximately 2 mm, with a cloud value of 90 to 99%, diffusing the light mixed by the light diffusing light guide plate 125, to radiate the resulting white light with uniform luminance to the set of optical sheets 145. The set of optical sheets 145 uplifts this white light along the line normal to the light diffusing plate 141 to elevate the luminance.

Figure 18:
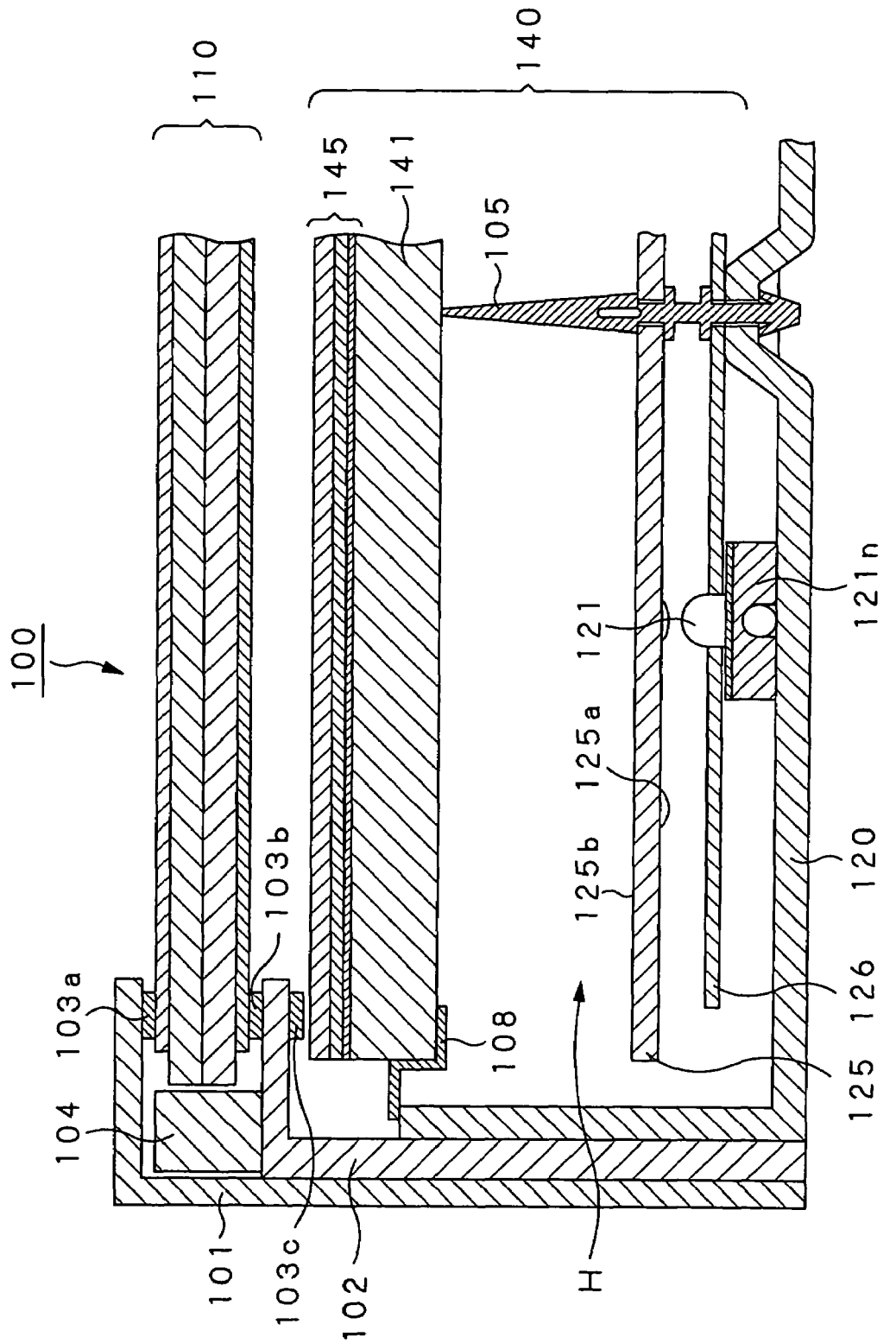
FIG. 18 is a cross-sectional view showing the liquid crystal display apparatus taken along line X—X in FIG. 16.

FIG. 18 depicts a partial cross-sectional view of the liquid crystal display apparatus 100 in an assembled state, taken along line XX of FIG. 16. Referring to FIG. 18, the liquid crystal display panel 110, forming the liquid crystal display apparatus 100, is sandwiched and held via spacers 103a, 103b between an outer frame 101 and an inner frame 102, both acting as an outer enclosure for the liquid crystal display apparatus 100. A guide member 104 is provided between the outer frame 101 and the inner frame 102 to suppress the liquid crystal display panel 110, sandwiched between the outer frame 101 and the inner frame 102, from being shifted in the longitudinal direction.

On the other hand, a backlight device 140, forming the liquid crystal display apparatus 100, includes a light diffusing plate 141, overlaid with the set of optical sheets 145, described above, and the light diffusing light guide plate 125. The reflective sheet 126 is arranged between the light diffusing light guide plate 125 and the backlight enclosure 120. The reflective sheet 126 is arranged so that its reflective surface faces a light incident surface 125a of the light diffusing light guide plate 125 and so that the reflective surface will be closer to the backlight enclosure 120 than to the light emitting direction from the light emitting diode 121.

The reflective sheet 126 is a silver augmented reflective film formed by sequentially laminating a silver reflecting film, a low refractive index film and a high refractive index film on a sheet substrate. This reflective sheet 126 mainly reflects light emitted by the light emitting diode 121 and incident thereon after reflection by the light diffusing light guide plate 125.

The light diffusing plate 141, light diffusing light guide plate 125 and the reflective sheet 126, provided to the backlight device 140, are arranged facing one another, as shown in FIG. 18, and are retained within the backlight enclosure 120 of the backlight device 140 as the spacing one from another is maintained by plural optical studs 105 provided to the backlight enclosure 120. The light diffusing plate 141 is also retained by a bracket member 108 provided to the backlight enclosure 120.

(Driving Circuit of Liquid Crystal Display Apparatus)

Figure 19:
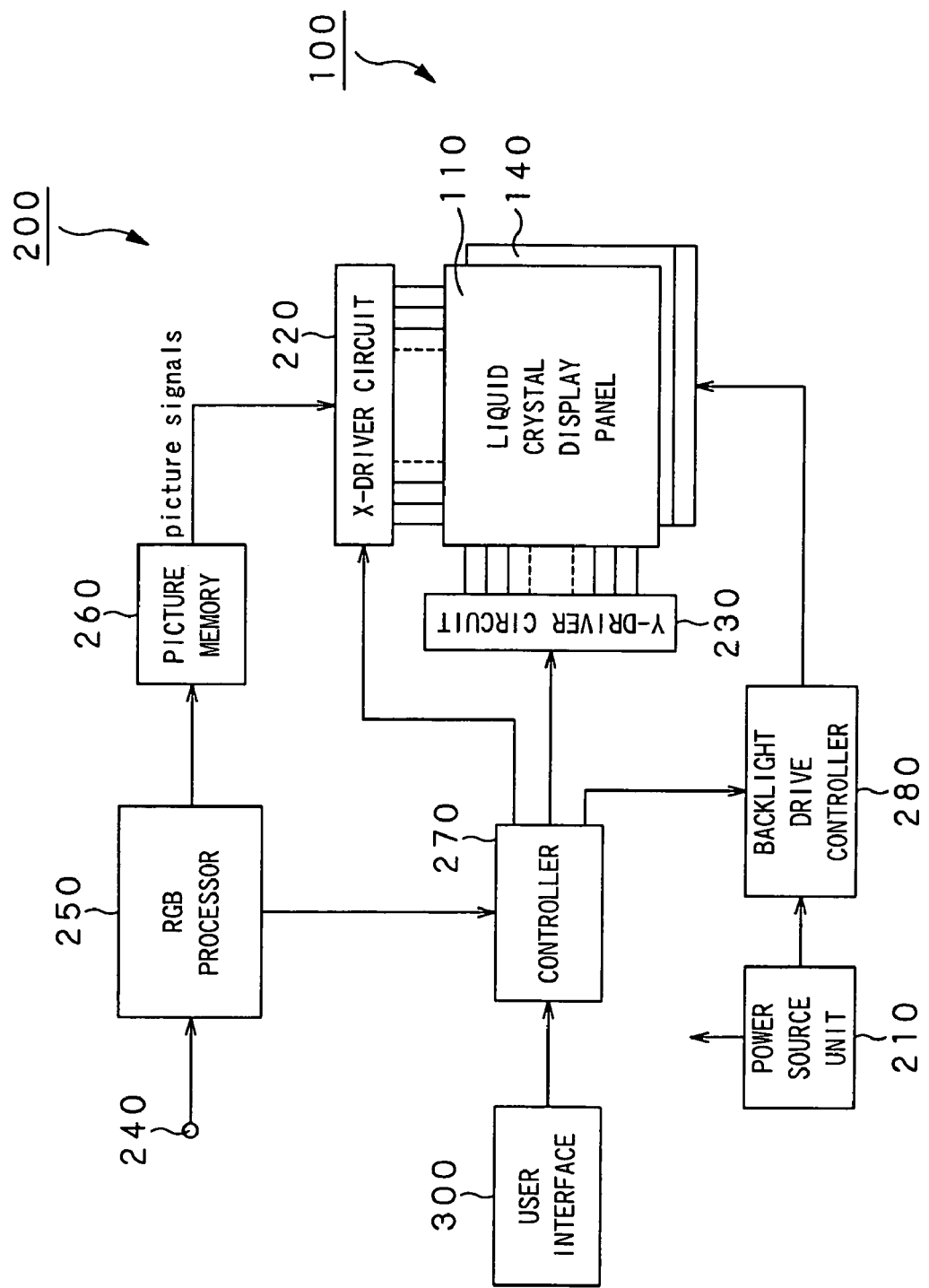
FIG. 19 is a block diagram showing a circuit for driving the liquid crystal display apparatus.

The liquid crystal display apparatus 100, described above, is driven by a driving circuit 200 shown for example in FIG. 19. The driving circuit 200 includes a power source unit 210, supplying the driving power for the liquid crystal display panel 110 and the backlight device 140, an X-driver circuit 220 and a Y-driver circuit 230, driving the liquid crystal display panel 110, an RGB processor 250, supplied with externally supplied picture signals and also supplied via an input terminal 240 with picture signals received by a receiver, not shown, of the liquid crystal display apparatus 100, and processed by a picture signal processor, a picture memory 260 and a controller 270, connected to the RGB processor 250, and a backlight drive controller 280, driving and controlling the backlight device 140.

In this driving circuit 200, the picture signals, supplied thereto via input terminal 240, are processed e.g. with chroma processing, by the RGB processor 250, and converted from composite signals into RGB separate signals, suited for driving the liquid crystal display panel 110, so as to be supplied to the controller 270, and so as to be supplied via picture memory 260 to the X-driver circuit 220.

The controller 270 also controls the controls the X-driver circuit 220 and the Y-driver circuit 230 at a preset timing consistent with the RGB separate signals, to drive the liquid crystal display panel 110 by the RGB separate signals supplied via picture memory 260 to the X-driver circuit 220, in order to display a picture corresponding to the RGB separate signals.

The backlight drive controller 280 generates pulse width modulated (PWM) signals, from the voltage supplied from the power source unit 210, in order to drive the light emitting diodes 121 as light sources for the backlight device 140. In general, the color temperature of the light emitting diode is dependent on the operating temperature. Thus, for realizing faithful color reproduction (for rendering the color temperature constant) as desired luminance is achieved, it is necessary to drive the light emitting diodes 121, using pulse width modulated signals, to suppress color changes from occurring.

A user interface 300 is an interface for selecting the channels received by the aforementioned receiver, not shown, for adjusting the speech output volume from the speech outputting unit, not shown, and for adjusting the white balance or luminance of white light from the backlight device 140 illuminating the liquid crystal display panel 110.

For example, if the user has adjusted the luminance from the user interface 300, a luminance control signal is transmitted via controller 270 of the driving circuit 200 to the backlight drive controller 280. The backlight drive controller 280 is responsive to this luminance control signal to change the duty ratio of the pulse width modulated signal, for each of the red light emitting diode 121R, green light emitting diode 121G and the blue light emitting diode 121B, as the backlight drive controller driving-control the red light emitting diode 121R, green light emitting diode 121G and the blue light emitting diode 121B.

(Light Dimming Dot Pattern Light)

Figure 24:
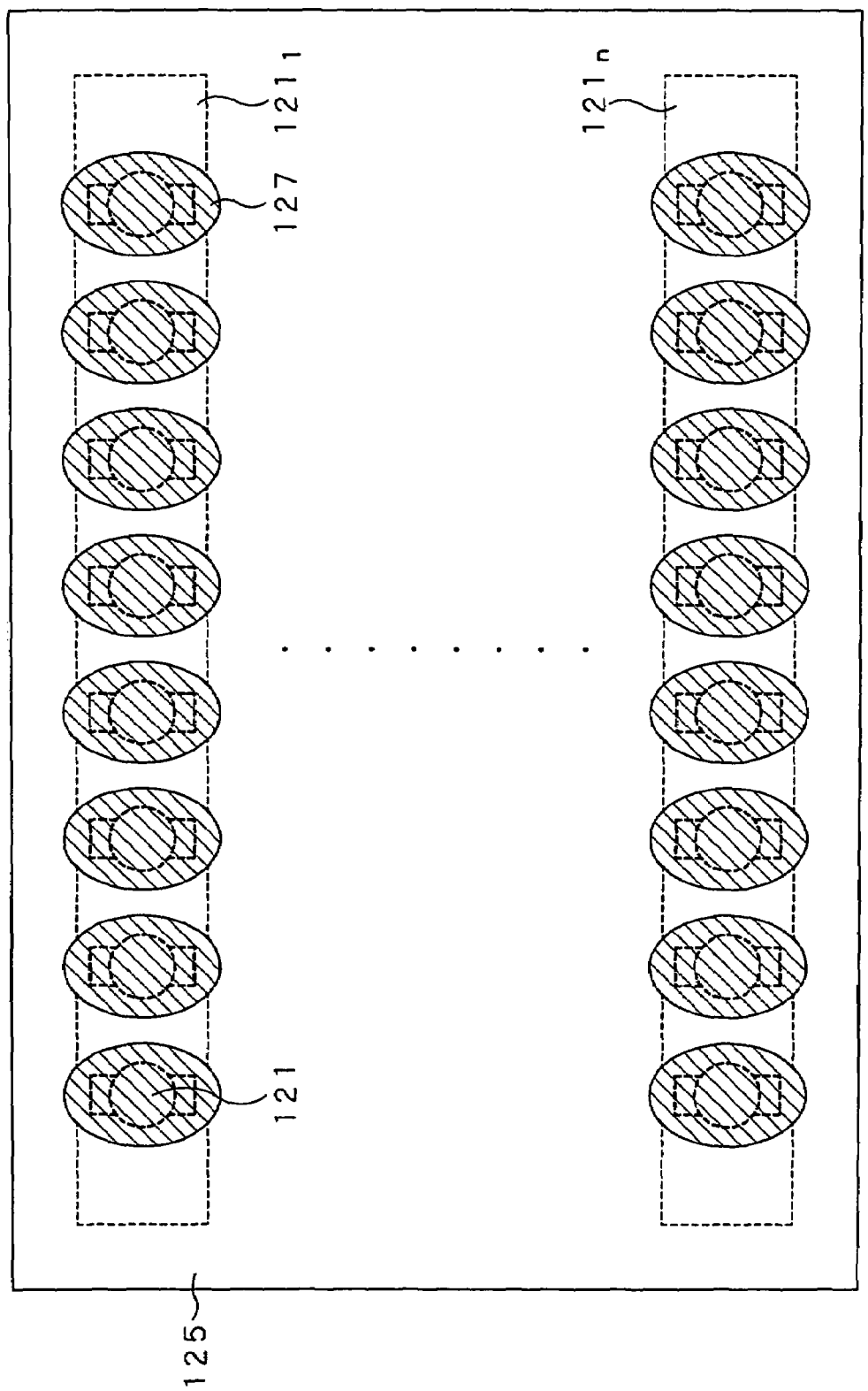
FIG. 24 shows an example of a light dimming dot pattern printed on a light diffusing light guide plate provided to the backlight device of the liquid crystal display apparatus.

The light dimming dot pattern, formed on the light diffusing light guide plate 125, will now be explained in detail. Referring to FIG. 24, the light dimming dot pattern is formed by printing light dimming dots 127, facing the light emitting diodes 121 of the light emitting diodes 121n in a one-for-one relationship, on the light incident surface 125a or on the light radiating surface 125b of the light diffusing light guide plate 125.

The light dimming dot pattern, printed on the light diffusing light guide plate 125, reflects the incident light by reflective properties innate to the ink. The light dimming dot pattern also efficiently diffuses and reflects the incident light by the light shielding properties of the light shielding agent added to the ink and to the light diffusing properties innate to the light diffusing agent. The light diffusing light guide plate 125, carrying the light dimming dot pattern, printed thereon, suppresses the generation of locally high brightness areas, termed lamp images, from being produced by light emission directivity of the light emitting diodes 121, thereby providing for a uniform brightness of the entire surface. These lamp images may become of a problem when the light radiated from a point light source is radiated with planar radiation.

Moreover, since the light diffusing effect of the light diffusing light guide plate 125 is improved as a result of printing of the light dimming dot pattern, the light mixing performance of light beams radiated from the light emitting diodes 121 may be improved to suppress color irregularities.

Figure 20A:
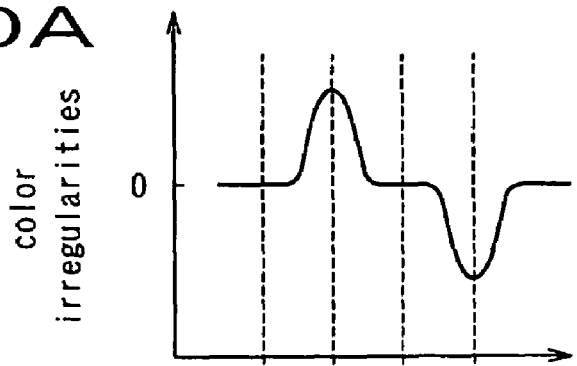
FIGS. 20A and 20B illustrate color irregularities in case the light dimming dot pattern is not printed on a light diffusing light guide plate, where
Figure 20B:
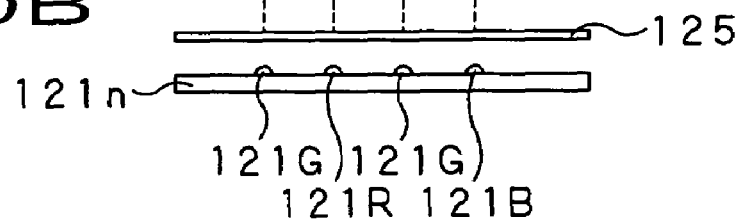

Referring to FIG. 20B, the light radiated via light diffusing light guide plate 125, not carrying the light dimming dot pattern, printed thereon, when the light emitting diodes 121 illuminates the light diffusing light guide plate 125, is poor in color mixing performance and suffers severe color irregularities, such that red light is perceived strongly directly above the red light emitting diode 121R and blue light is perceived strongly directly above the blue light emitting diode 121B, as shown in FIG. 20A. It is noted that, in FIG. 20B, only one repetitive unit of the light emitting diodes is shown.

Figure 21A:
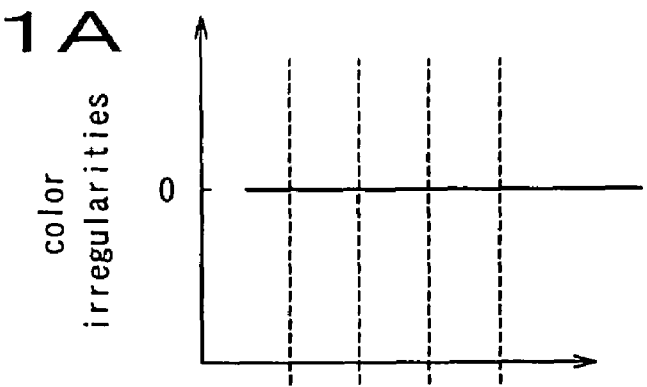
FIGS. 21A and 21B illustrate the effect of suppressing color irregularities in case the light dimming dot pattern is printed on a light diffusing light guide plate, where
Figure 21B:
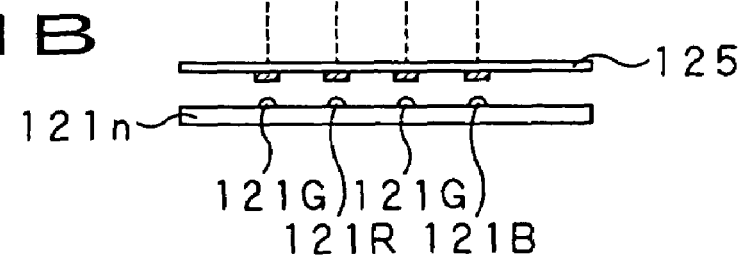

If conversely the light diffusing light guide plate 125, carrying the light dimming dot pattern, formed by plural light dimming dots 127, is illuminated with the light emitting diodes 121, as shown in FIG. 21B, the light radiated via the light diffusing light guide plate 125 exhibits extremely high color mixing performance, thus appreciably suppressing color irregularities, as shown in FIG. 21A. It is noted that, in FIG. 21B, only one repetitive unit of the light emitting diodes is again shown.

The light dimming dot pattern is printed on the light diffusing light guide plate 125 using the same printing technique as that used in the first embodiment for printing the light dimming dot pattern on the light diffusing plate 15. That is, a plate for the light dimming dot pattern is generated by the plate generating apparatus shown in FIG. 11, and the light dimming dot pattern is printed on the light diffusing light guide plate 125, through the printing steps shown in FIG. 10, using the printer shown in FIG. 9 and the ink having desired performance.

The ink used in printing the light dimming dot pattern may be obtained by concocting various starting materials (e.g. pharmaceuticals making up the ink) containing a light shielding agent and a light diffusing agent. As the light shielding agent and the light diffusing agent, the following materials may be used, only by way of an example.

The light shielding agent may be enumerated by, for example, titanium oxide, barium sulfide, calcium carbonate, silicium carbide, alumina oxide, zinc oxide, nickel oxide, calcium hydroxide, cerium oxide, lithium sulfide, barium titanate, tri-iron tetroxide, methacrylic resin powders, mica (sericite), kaolin powders, kaolin, bentonite, silver powders, gold powders and pulp fibers.

The light diffusing agent may be enumerated by, for example, silicium oxide, glass beads, glass powders, glass fibers, liquid silicon, quartz powders, gold-plated resin beads, cholesteric liquid crystal solution or recrystallized acrylic resin powders.

The ink generated may be added by 0 to 7 wt % of an ultraviolet ray inhibitor and 0 to 1 wt % of an anti-foaming agent. The ultraviolet ray inhibitor has the effect of suppressing the ultraviolet light, contained in the light radiated from a light source, while the anti-foaming agent has the effect of lowering surface tension to suppress the foaming in the ink.

If the light dimming dot pattern is printed by the printer of FIG. 9 on the light diffusing light guide plate 125, through the printing steps shown in FIG. 10, the print controller 56 in a step S11 exercises control for starting regular printing for printing the light dimming dot pattern on the light diffusing light guide plate 125. At this time, the ink printing process is repeated a number of times until such a film thickness is reached for which the light shielding performance by the light dimming dot pattern formed as a result of the printing is sufficient such that desired transmittance for all light rays is achieved.

Specifically, the light dimming dot pattern, obtained by one printing operation, is of a film thickness on the order of 5 μm, such that, if printing is made using e.g. white ink, a sufficient light shielding performance cannot be achieved, while color irregularities also cannot be removed. Thus, printing is carried out twice or thrice to form a light dimming dot pattern of a film thickness of the order of 12 μm which will assure a sufficient light shielding performance.

Figures 22A, 22B:
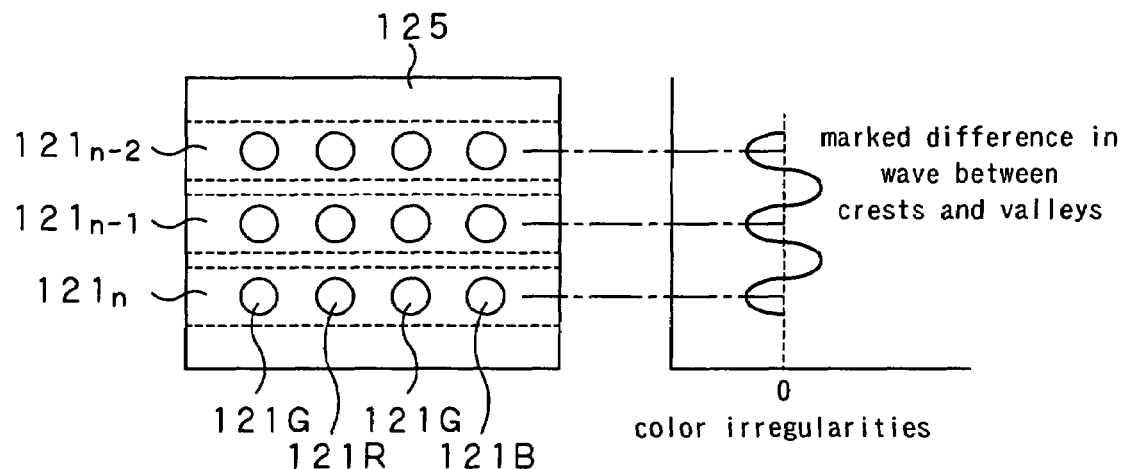
FIGS. 22A and 22B illustrate color irregularities in case the number of times of printing of the light dimming dot pattern is one, where

For example, if the light dimming dot pattern is formed by one printing operation on the light diffusing light guide plate 125, the light radiated via this light diffusing light guide plate 125 to a site directly above each of the light emitting diode unit 121n differs as to the detected main waveform range from the light radiated to a site partway between the neighboring ones of the light emitting diode unit 121n, thus producing color irregularities shown in FIG. 22B. It is noted that only one repetitive unit of the light emitting diodes 121 is shown as the light emitting diode unit 121n in FIG. 22A.

Figures 23A, 23B:
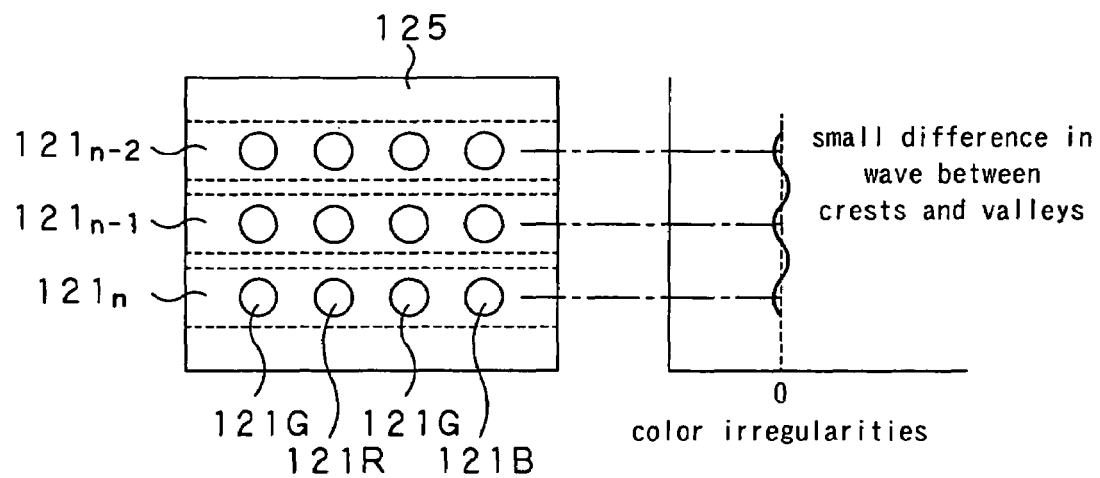
FIGS. 23A and 23B illustrate color irregularities in case the number of times of printing of the light dimming dot pattern is two or three, where

On the other hand, in case the light dimming dot pattern is formed by carrying out printing twice or thrice on the light diffusing light guide plate 125, the light radiated via this light diffusing light guide plate 125 to the site directly above each of the light emitting diode unit 121n is approximately equal as to the detected main waveform range to the light radiated to the site partway between the neighboring ones of the light emitting diode unit 121n, thus generating white light with suppressed color irregularities, as shown in FIG. 23B. It is noted that only one repetitive unit of the light emitting diodes 121 is shown as the light emitting diode unit 121n in FIG. 23A.

In printing the light dimming dot pattern using a gray ink (silver color ink), sufficient light shielding properties may be obtained even though the film thickness is on the order of 5 μm, so that only one printing operation suffices. Although sufficient light shielding properties may be achieved by controlling the film thickness, that is, the number of times of printing, depending on the sort of the ink used, as described above, it is also possible to obtain desired transmittance for all light rays using different sorts of the ink. For example, the light dimming dot pattern may be formed by printing white ink for the first printing operation and by overlaying the gray color ink for the second printing operation to form the light dimming dot pattern. By carrying out the printing a number of times, using different inks, to form the light dimming dot pattern, it is possible to make delicate adjustment of the transmittance for all light rays which was not possible with the overlay coating of the same sort of the ink.

Referring to FIG. 24, the size of the light dimming dots 127 of the light dimming dot pattern is varied depending on the spacing (distance) from the respective light emitting diodes 121, on the premises that the dots are larger in size than the outer size of the light emitting diode 121, in particular the outer size of the light emitting part thereof.

For example, if the distance between the light emitting diode 121 and the light dimming dot 127 is small, the size, that is, the area, of the light dimming dot 127, is diminished, because the light emitted from the light emitting diode 121 reaches the light dimming dot 127 without becoming appreciably enlarged. If conversely the distance between the light emitting diode 121 and the light dimming dot 127 is large, the size, that is, the area, of the light dimming dot 127, is increased, because the light emitted from the light emitting diode 121 reaches the light dimming dot 127 after becoming enlarged.

Specifically, with use of the light diffusing light guide plate 125, with the transmittance for all light rays of 50 to 93%, the problem of color irregularities, discussed above, may be obviated by adjusting the area S of the light dimming dot 127, within a range of S=28 to 86 mm$^2$, depending on the transmittance for all light rays.

In FIG. 24, the center of light emission of the light emitting diode 121 is shown to be coincident with the center of the light dimming dot 127. It is however only sufficient that the area S of the light dimming dot 127 is such that S=28 to 86 mm$^2$, it being unnecessary that the center of light emission 121c of the light emitting diode 121 is coincident with the center 127c of the light dimming dot 127, as shown for example in FIG. 25. The shape of the light dimming dot 127 is not limited to an elliptical shape, such as is shown in FIGS. 24 and 25, and any suitable dot shape may be used, on the condition that the area S of the light dimming dot 127 meets the condition S=28 to 86 mm$^2$. Stated differently, the light dimming dot 127 is such that the area S of the light dimming dot 127 meets the condition S=28 to 86 mm$^2$, with the dot being symmetrical or unsymmetrical with respect to the center of light emission 121c of the light emitting diode 121.

In addition, the shape or the area of the light dimming dot 127 of the light dimming dot pattern, or the composition of the ink material forming the light dimming dot 127, may be made to differ for each of the colors of the red light emitting diode 121R, green light emitting diode 121G and the blue light emitting diode 121B, in a one-for-one relationship with the light dimming dots, that is, from one color to another. This slightly complicates the plate forming step or the printing step by the printer, however, it is possible to improve luminance further, equalize the luminance of light radiated with planar light emission and to suppress color irregularities by individually adjusting the light shielding or reflecting properties of the light dimming dots 127.

The optical paths of the red, green and blue light beams, radiated from the light emitting diodes 121, in case of employing the light diffusing light guide plate 125 carrying the light dimming dot pattern, will now be explained.

(In Case the Light Dimming Dot Pattern has been Printed on the Light Incident Surfaces 125a)

The optical paths in case the light dimming dot pattern has been formed on the light incident surfaces 125a of the light diffusing light guide plate 125 will now be explained. When the light dimming dot pattern has been formed on the light incident surfaces 125a of the light diffusing light guide plate 125, the light radiated from the light emitting diodes 121 is radiated with preset directivity and initially falls on the light incident surfaces 125a of the light diffusing light guide plate 125.

Of the light beams incident on the light incident surfaces 125a, the light beams incident on the light dimming dot pattern is diffused and reflected by each light dimming dot 127 to proceed towards the reflective sheet 126.

On the other hand, the light beam of the respective colors, incident on a plain area of the light diffusing light guide plate 125, not provided with the light dimming dot 127, falls on the plain area of the light diffusing light guide plate 125. Part of the light incident on the plain area of the light diffusing light guide plate 125 is diffused into the bulk of the light diffusing light guide plate 125, as it undergoes total reflection, while part of the same incident light undergoes refraction and exits from the light radiating surface 125b. The light diffused in the bulk of the light diffusing light guide plate 125, as it undergoes total reflection, is ultimately incident on the light radiating surface 125b, at an angle smaller than the critical angle, and radiated from the light diffusing light guide plate 125.

The light diffused and reflected by the light dimming dot 127 is reflected by the reflective sheet 126 and re-incident on the light incident surfaces 125a of the light diffusing light guide plate 125. The light incident on the light incident surfaces 125a of the light diffusing light guide plate 125 is incident on the plain part or on the light dimming dot 127 to follow the optical path as described above.

(In Case the Light Dimming Dot Pattern is Printed on the Light Radiating Surface 125b)

The optical paths in case the light dimming dot pattern is formed on the light radiating surface 125b of the light diffusing light guide plate 125 will now be explained. When the light dimming dot pattern is formed on the light radiating surface 125b of the light diffusing light guide plate 125, the light radiated from the light emitting diodes 121 is initially incident on the light diffusing light guide plate 125. Of the light incident on the light diffusing light guide plate 125, part of the light is diffused in the bulk of the light diffusing light guide plate 125, as it undergoes total reflection, while part of the light is refracted and radiated from the light radiating surface 125b.

The light diffused within the bulk of the light diffusing light guide plate 125 and incident on the light radiating surface 125b at an angle smaller than the critical angle is radiated from the light diffusing light guide plate 125. However, since the light dimming dot pattern is formed on the light radiating surface 125b of the light diffusing light guide plate 125, the light incident on the light dimming dot 127 on the light radiating surface 125b undergoes diffusion and reflection. The light reflected on the light dimming dot 127 undergoes total reflection in the bulk of the light diffusing light guide plate 125, or exits from the light incident surfaces 125a so as to be then reflected by the reflective sheet 126 and again incident on the plain area of the light diffusing light guide plate 125.

Thus, in case the light dimming dot pattern is formed on the light incident surfaces 125a or on the light radiating surface 125b of the light diffusing light guide plate 125, a preset proportion of light is diffused and reflected by the light dimming dots 127 before the light is radiated from the light radiating surface 125b. Since the proportion of the light radiated from the light emitting diodes 121 and directly radiated from the light diffusing light guide plate 125 is decreased, as a result of the diffusion and reflection by the light dimming dots 127, it is possible to suppress non-uniform luminance such that only a limited area is of high luminance due to light emission directivity proper to the light emitting diode 121. That is, the light beams of respective colors, radiated from the light emitting diodes 121, are diffused by reflection by the light dimming dots 127 to improve mixing of light of respective colors generated by the light emitting diode 121 as well as to provide for equalized luminance.

Moreover, since the proportion of light reflected between the light diffusing light guide plate 125 and the reflective sheet 126 is also increased, the distance between the light diffusing light guide plate 125 provided with the light dimming dot pattern and the reflective sheet 126 may be shorter than that between the light diffusing light guide plate 125 not provided with the light dimming dot pattern and the reflective sheet 126.

In general, if, when the red light, green light and the blue light, radiated from the light emitting diodes, are mixed, the distance until the time of color mixing is long, that is, the backlight device is thick, the color mixing becomes correspondingly excellent. Since the light dimming dot pattern is now formed on the light diffusing light guide plate 125, the number of times the light radiated from the light emitting diodes 121 is reflected between the light diffusing light guide plate 125 and the reflective sheet 126 is increased, so that the total distance traversed by the light emitted from the light emitting diodes 121 and radiated from the light diffusing light guide plate 125 is extended. Since the light is incident over a wide range, corresponding to substantially the entire surface of the light diffusing light guide plate 125, by the diffusion and reflection by the light dimming dot pattern and several times of reflections by the reflective sheet 126, the favorable effect similar to that obtained on increasing the thickness of the backlight device 140 may be obtained. Specifically, the distance d between the light diffusing light guide plate 125 and the light emitting diodes 121 may be approximately 7 mm or less.

Consequently, the light radiated from the backlight device 140, through the light diffusing light guide plate 125, carrying the light dimming dot pattern, via the light diffusing plate 141 and the set of optical sheets 145, to illuminate the liquid crystal display panel 110, is the white light, diminished in color irregularities or in luminance irregularities, and exhibits equalized color and luminance.

EXAMPLES

For verifying the favorable result derived from the printing of the light dimming dot pattern on the light diffusing light guide plate 125 of the liquid crystal display apparatus 100, shown as the second embodiment, a sample of the backlight device 140, having the light dimming dot pattern printed thereon, and another sample of the backlight device 140, not having the light dimming dot pattern printed thereon, were provided, and comparison was made of the results of visual check on light radiation from the light emitting diodes 121.

Example 1

In an Example 1, a backlight device 140, illuminating a 46-inch liquid crystal display panel 110, as shown in FIG. 26, is used.

In this example, a backlight unit 121n, having a plural number of light emitting diodes 121, with a set of a green light emitting diode 121G, a red light emitting diode 121R, a green light emitting diode 121G and a blue light emitting diode 121B, as a repetitive unit, was arrayed so that the longitudinal direction of the array will become the horizontal direction of the backlight device 140, as shown in FIG. 17. A number of the backlight unit 121n were arrayed side-by-side with a pitch between neighboring backlight unit 121n of 80 mm.

The light diffusing light guide plate 125, provided to the backlight device 140, is formed of polyolefin with transmittance for all light rays of 90% and a cloud value of 70%.

Two of the light diffusing light guide plates 125 are provided and no printing is made on one of the plates while a light dimming dot pattern is printed on the other plate.

In the Example 1, two different types of the light dimming dot pattern are overlaid on the light diffusing light guide plate 125. Of the two types of the light dimming dot pattern, the pattern directly printed on the light diffusing light guide plate 125, that is, the undercoat pattern, is labeled a light dimming dot pattern P1. The pattern overlaid on the light dimming dot pattern P1, that is, an overcoat pattern, is labeled a light dimming dot pattern P2.

The light dimming dot pattern P1 was composed of white ink for polyolefin added by 5 wt % of an ultraviolet light inhibitor and 0.2 wt % of an anti-foaming agent, and was printed by the process as explained with reference to FIG. 10, so that, when the light diffusing light guide plate 125 is assembled within the backlight device 140, the light dimming dots 127 are in register with the light emitting diodes 121 in a one-for-one relationship. Each light dimming dot of the light dimming dot pattern P1 was substantially elliptically-shaped, with the short axis and the long axis of the ellipse being 7 mm and 11 mm, respectively, with an area of the ellipse being approximately 68 mm$^2$. The light dimming dot was printed so that the center of the ellipse coincides with the center of light emission of the light emitting diode 121. The printing operation was carried out only once.

5 wt % of an ultraviolet ray inhibitor and 0.2 wt % of an anti-foaming agent were added to a gray ink obtained on adding 0.5 wt % of black ink to white ink for polyolefin. The resulting ink was printed as an overcoat layer on the light dimming dot pattern P1 printed on the light diffusing light guide plate 125, for forming the light dimming dot pattern P2. Each light dimming dot of the light dimming dot pattern P2 was substantially elliptically-shaped, with the short axis and the long axis of the ellipse being 7 mm and 9.5 mm, respectively, with an area of the ellipse being approximately 56 mm$^2$. The light dimming dot was printed so that the center of the ellipse coincided with the center of each light dimming dot of the light dimming dot pattern P1. The printing operation was carried out only once.

The light diffusing light guide plate 125, carrying the light dimming dot pattern P2 overlaid on the light dimming dot pattern P1, and another light diffusing light guide plate 125, not carrying the light dimming dot pattern, were arranged in the backlight device 140, in an interchanging fashion. The light emitting diodes 121 were caused to radiate light for each case and the light radiated from the set of optical sheets 145 were observed visually. The results are shown below.

<In Case no Light Dimming Dot Pattern was Printed>

In this case, the illuminating light, radiated from the backlight device 140, exhibited poor color mixing of respective colors emitted from the light emitting diodes 121, and turned out to be blurred spread light with emphasized red tone.

<In Case the Light Dimming Dot Pattern was Printed>

In this case, the illuminating light, radiated from the backlight device 140, exhibited good color mixing of respective colors emitted from the light emitting diodes, and the luminance difference between light and dark areas lying directly above the respective light emitting diodes 121 and lying partway between the neighboring light emitting diodes 121, was suppressed, while the luminance of light emitted in planar radiation could be equalized.

By printing the light dimming dot pattern in this manner on the light diffusing light guide plate 125, the color mixing properties may be improved, while the light emitted with planar light radiation may be improved in luminance.

Example 2

In Example 2, a backlight device 140, illuminating the 40-inch liquid crystal display panel 110, as shown in FIG. 27, was used.

In this example, a backlight unit 121$n$, having a plural number of light emitting diodes 121, was arrayed with a set of a green light emitting diode 121G, a red light emitting diode 121R, a green light emitting diode 121G and a blue light emitting diode 121B, as a repetitive unit, so that the longitudinal direction of the array will be the horizontal direction of the backlight device 140, as shown in FIG. 17. A number of the backlight units 121$n$ were arrayed side-by-side with a pitch between neighboring backlight unit 121$n$ of 85 mm.

The light diffusing light guide plate 125, provided to the backlight device 140, was formed of PMMA with transmittance for all light rays of 93% and a cloud value of 90%.

Two of the light diffusing light guide plates 125 were provided and no printing was made on one of the plates while a light dimming dot pattern was printed on the other plate. The light dimming dot pattern was composed of white concentrated ink added by 6 wt % of an ultraviolet light inhibitor and 0.1 wt % of an anti-foaming agent, and was printed by the process as explained with reference to FIG. 10, so that, when the light diffusing light guide plate 125 was assembled within the backlight device 140, the light dimming dots were in register with the light emitting diodes 121 in a one-for-one relationship. Each light dimming dot of the light dimming dot pattern was circular in shape, with the diameter of the circle being 7 mm, with an area of the circle being approximately 38 mm$^2$. The light dimming dot was printed so that the center of the circle coincided with the center of light emission of the light emitting diode 121. The printing operation was carried out thrice.

The light diffusing light guide plate 125, carrying the light dimming dot pattern, and another light diffusing light guide plate 125, not carrying the light dimming dot pattern, were arranged in the backlight device 140, in an interchanging fashion. The light emitting diodes 121 were caused to radiate light for each case and the light radiated from the set of optical sheets 145 were observed visually. The results are shown below.

<In Case no Light Dimming Dot Pattern was Printed>

In this case, the illuminating light, radiated from the backlight device 140, exhibited poor color mixing of respective colors emitted from the light emitting diodes 121, and turned out to be blurred spread light with emphasized red tone.

<In Case a Light Dimming Dot Pattern was Printed>

In this case, the illuminating light, radiated from the backlight device 140, exhibited good color mixing of respective colors emitted from the light emitting diodes 121, and the luminance difference between the luminance of the light area lying directly above the respective light emitting diodes 121 and the luminance of the dark area lying partway between the neighboring light emitting diodes 121, was suppressed. In addition, the light emitted with planar light radiation could be equalized in luminance.

Thus, by printing the light dimming dot pattern on the light diffusing light guide plate 125, the color mixing performance may be improved, while the plane radiated light may be equalized in luminance.

Example 3

In Example 3, a backlight device 140, illuminating a 40-inch liquid crystal display panel 110, as shown in FIG. 28, was used.

In this example, a backlight unit 121$n$, including a plural number of light emitting diodes 121, with a set of a red light emitting diode 121R, a green light emitting diode 121G and a blue light emitting diode 121B, as a repetitive unit, was arrayed so that the longitudinal direction of the array will become the horizontal direction of the backlight device 140, as shown in FIG. 17. A number of the backlight units 121*n* were arrayed side-by-side with a pitch between neighboring backlight unit 121*n* of 85 mm.

The light diffusing light guide plate 125, provided to the backlight device 140, was formed of polyolefin with transmittance for all light rays of 55% and a cloud value of 92.5%.

Two of the light diffusing light guide plates 125 were provided and no printing was made on one of the plates while a light dimming dot pattern was printed on the other plate. The light dimming dot pattern was composed of white ink for polyolefin added by 7 wt % of an ultraviolet light inhibitor and 0.25 wt % of an anti-foaming agent, and was printed by the process as explained with reference to FIG. 10, so that, when the light diffusing light guide plate 125 was assembled within the backlight device 140, the light dimming dots were in register with the light emitting diodes 121 in a one-for-one relationship. Each light dimming dot of the light dimming dot pattern was substantially elliptically-shaped, with the short and long diameters of the ellipsis being 7 mm and 11 mm, respectively, with an area of the ellipsis being approximately 86 mm$^2$. The light dimming dot was printed so that the center of the ellipsis coincided with the center of light emission of the light emitting diode 121. The printing operation was carried out twice.

The light diffusing light guide plate 125, carrying the light dimming dot pattern, and another light diffusing light guide plate 125, not carrying the light dimming dot pattern, were arranged in the backlight device 140, in an interchanging fashion. The light emitting diodes 121 were caused to radiate light for each case and the light radiated from the set of optical sheets 145 was observed visually. The results are shown below.

<In Case no Light Dimming Dot Pattern was Printed>

In this case, the illuminating light, radiated from the backlight device 140, exhibited poor color mixing of respective colors emitted from the light emitting diodes, and turned out to be blurred spread light with emphasized red tone.

<In Case the Light Dimming Dot Pattern was Printed>

In this case, the illuminating light, radiated from the backlight device 140, exhibited good color mixing of respective colors emitted from the light emitting diodes, and the luminance difference between the luminance in a light area lying directly above the respective light emitting diodes 121 and that in a dark area lying partway between the neighboring light emitting diodes 121 was suppressed, so that the illuminating light was equalized in luminance.

Example 4

In Example 4, a backlight device 140, illuminating the 40-inch liquid crystal display panel 110, as shown in FIG. 29, was used.

In this example, a backlight unit 121*n*, having a plural number of light emitting diodes 121, was arranged with a set of a green light emitting diode 121G, a red light emitting diode 121R, a green light emitting diode 121G and a blue light emitting diode 121B, as a repetitive unit, so that the longitudinal direction of the array will become the horizontal direction of the backlight device 140, as shown in FIG. 17. A number of the backlight unit 121*n* were arrayed side-by-side with a pitch between neighboring backlight unit 121*n* of 70 mm.

The light diffusing light guide plate 125, provided to the backlight device 140, was formed of PMMA with transmittance for all light rays of 50% and a cloud value of 93%.

Two of the light diffusing light guide plates 125 were provided, and no printing was made on one of the plates, while a light dimming dot pattern was printed on the other plate. The light dimming dot pattern was composed of white concentrated ink added by 4 wt % of an ultraviolet light inhibitor and 0.1 wt % of an anti-foaming agent, and was printed by the process as explained with reference to FIG. 10, so that, when the light diffusing light guide plate 125 was assembled within the backlight device 140, the light dimming dots 127 were in register with the light emitting diodes 121 in a one-for-one relationship. Each light dimming dot of the light dimming dot pattern was circular in shape, with the diameter of the circle being 6 mm, with an area of the circle being approximately 28 mm$^2$. The light dimming dot was printed so that the center of the circle coincided with the center of light emission of the light emitting diode 121. The printing operation was carried out once.

The light diffusing light guide plate 125, carrying the light dimming dot pattern, and another light diffusing light guide plate 125, not carrying the light dimming dot pattern, were arranged in the backlight device 140, in an interchanging fashion. The light emitting diodes 121 were caused to radiate light for each case and the light radiated from the set of optical sheets 145 was observed visually. The results are shown below.

<In Case no Light Dimming Dot Pattern is Printed>

In this case, the illuminating light, radiated from the backlight device 140, exhibited poor color mixing of respective colors, emitted from the light emitting diodes, and turned out to be blurred spread light with emphasized red tone.

<In Case the Light Dimming Dot Pattern was Printed>

In this case, the illuminating light, radiated from the backlight device 140, exhibited good color mixing of respective colors emitted from the light emitting diodes, and the difference in luminance between light and dark areas lying directly above the respective light emitting diodes 121 and lying partway between the neighboring light emitting diodes 121, respectively, was suppressed, so that the illuminating light was equalized in luminance.

Thus, by printing the light dimming dot pattern on the light diffusing light guide plate 125, the color mixing performance could be improved, while the plane radiated light could be equalized in luminance.

In the Examples 2 to 4, the light dimming dot pattern was printed on the light diffusing light guide plate 125, using only white ink. Alternatively, a gray color ink (silver color ink), added by, for example, 3 wt % of an ultraviolet ray inhibitor and 0.15 wt % of an anti-foaming agent, may be used with similar favorable results.

It will be seen from above that, with the liquid crystal display apparatus 100, shown as the second embodiment, in which the light dimming dot pattern is printed on the light diffusing light guide plate 125, provided to the backlight device 140, having the light emitting diodes 121 as the light source, it is possible to improve color mixing performance of the respective color light beams and to equalize the luminance of the planar illuminating light, as well as to provide for sufficient luminance without raising the light source power.

The light dimming dot pattern, thus printed on the light diffusing light guide plate 125, may equally be printed on the light diffusing plate 141 with favorable results similar to those when the light dimming dot pattern is printed on the light diffusing light guide plate 125. Moreover, the light dimming dot pattern may be printed on both the light diffusing light guide plate 125 and the light diffusing plate 141 with equally favorable results.

In the liquid crystal display apparatus, shown as the first embodiment, the light dimming dot pattern is directly printed on the light diffusing light guide plate 14 or on the light diffusing light guide plate 15 and, in the liquid crystal display apparatus 100, shown as the second embodiment, the light dimming dot pattern is directly printed on the light diffusing light guide plate 125 or on the light diffusing light guide plate 141.

The light dimming dot pattern may be printed on a transparent film, and the resulting film may be bonded to the front or back surface of the light diffusing light guide plate 14 or the light diffusing plate 15 or to the front or back surface of the light diffusing light guide plate 125 or the light diffusing plate 141. When the light dimming dot pattern is printed on the transparent film, it is only sufficient to print the light dimming dot pattern sequentially on a roll of a transparent film, to cut it in a desired size and to bond it on the light diffusing light guide plate or the light diffusing plate, with favorable effects on mass production and reduction in manufacture costs.

The invention claimed is:

1. A backlight device comprising
a plurality of cold cathode ray tubes; and
a light diffusing plate arranged in the direction of light radiation from said cold cathode ray tubes, and having printed thereon a light dimming dot pattern, the light diffusing plate having transmittance for all light rays of 62 to 71% and a cloud value of 90 to 99%; wherein,
each dot of said light dimming dot pattern is arranged at a location corresponding to division by 24 to 48 of the spacing between neighboring ones of said cold cathode ray tubes, with the diameter of each dot being 0.16 to 0.7 mm depending on the distance from said cold cathode ray tubes.

2. The backlight device according to claim 1 wherein, with the transmittance for all light rays of said light diffusing plate being approximately 62% and with each dot of said light dimming dot pattern being arranged at a location corresponding to division by 24 of the spacing between neighboring ones of said cold cathode ray tubes, the diameter of each dot is 0.16 to 0.68 mm depending on the distance from said cold cathode ray tubes and assumes a value which becomes closer to 0.16 mm and to 0.68 mm the remoter and nearer the distance of each dot from said cold cathode ray tubes, respectively.

3. The backlight device according to claim 1 wherein, with the transmittance for all light rays of said light diffusing plate being approximately 66% and with each dot of said light dimming dot pattern being arranged at a location corresponding to division by 48 of the spacing between neighboring ones of said cold cathode ray tubes, the diameter of each dot is 0.16 to 0.7 mm depending on the distance from said cold cathode ray tubes and assumes a value which becomes closer to 0.16 mm and to 0.7 mm the remoter and nearer the distance of each dot from said cold cathode ray tubes, respectively.

4. The backlight device according to claim 1 wherein said cold cathode ray tube has a radiation luminance value of not less than 17000 cd/m$^2$ and a difference between the luminance value at a location on said cold cathode ray tube and that at a location partway between the neighboring cold cathode ray tubes is 700 to 1400 cd/m$^2$.

5. The backlight device according to claim 1 wherein said light diffusing plate is arranged at a distance not larger than 7 mm from a plane in which said plural cold cathode ray tubes are arranged.

6. The backlight device according to claim 1 wherein each dot of said light dimming dot pattern is printed on said light diffusing plate with an ink concocted with the concentration of the light shielding agent of 18 to 32 wt % and with the concentration of the light diffusing agent of 3.0 to 4.5 wt %.

7. The backlight device according to claim 6 wherein said ink contains an ultraviolet ray inhibitor having a concentration in the ink of 0 to 7 wt % and an anti-foaming agent in the ink of 0 to 1 wt %.

8. The backlight device according to claim 6 wherein the number of times of applying the ink in printing said light dimming dot pattern on said light diffusing plate is usually one and, if the ink is printed by overlay coating, the number of times of applying the ink is limited to two or three.

9. The backlight device according to claim 1 wherein the dots of said light dimming dot pattern are printed on said light diffusing plate in a staggered configuration at a distance of 1.2 to 2 mm along the longitudinal direction of said cold cathode ray tube and at a distance of 0.5 to 1 mm along the direction orthogonal to said longitudinal direction.

10. The backlight device according to claim 1 wherein said light dimming dot pattern is formed on one major surface of said light diffusing plate facing said cold cathode ray tubes or on the major surface opposite to said one major surface.

11. The backlight device according to claim 1 wherein said light dimming dot pattern is formed by depositing a transparent film, having printed thereon said light dimming dot pattern, on said one major surface or on said opposite major surface of said light diffusing plate.

12. A liquid crystal display apparatus having a light transmitting liquid crystal display panel and a backlight device for illuminating said liquid crystal display panel from the back side thereof, said backlight device comprising:
a light source, made up by a plurality of cold cathode ray tubes; and
a light diffusing plate arranged in the light radiating direction of said light source for facing said light source, said light diffusing plate having a transmittance for all light rays of 62 to 71% and a cloud value of 90 to 99% and carrying a light dimming dot pattern thereon;
said dots of said light dimming dot pattern being formed on said light diffusing plate lying at a location corresponding to division by 24 to 48 of the spacing between neighboring ones of said cold cathode ray tubes, with the diameter of said dots being 0.16 to 0.7 mm depending on the distance from said cold cathode ray tubes.

13. The liquid crystal display apparatus according to claim 12 wherein, with the transmittance for all light rays of said light diffusing plate being approximately 62% and with dots of said light dimming dot pattern being arranged at a location corresponding to division by 24 of the spacing between neighboring ones of said cold cathode ray tubes, the diameter of each dot is 0.16 to 0.68 mm depending on the distance from said cold cathode ray tubes and assumes a value which becomes closer to 0.16 mm and to 0.68 mm the remoter and nearer the distance of each dot from said cold cathode ray tubes, respectively.

14. The liquid crystal display apparatus according to claim 12 wherein, with the transmittance for all light rays of said light diffusing plate being approximately 66% and with each dot of said light dimming dot pattern being arranged at a location corresponding to division by 48 of the spacing between neighboring ones of said cold cathode ray tubes, the diameter of each dot is 0.16 to 0.7 mm depending on the distance from said cold cathode ray tubes and assumes a value which becomes closer to 0.16 mm and to 0.7 mm the remoter and nearer the distance of each dot from said cold cathode ray tubes, respectively.

15. The liquid crystal display apparatus according to claim 12 wherein said cold cathode ray tube has a radiation luminance value of not less than 17000 cd/m² and a luminance difference between the luminance value at a location on said cold cathode ray tube and that at a location partway between the neighboring cold cathode ray tubes is 700 to 1400 cd/m².

16. The liquid crystal display apparatus according to claim 12 wherein said light diffusing plate is arranged at a distance not larger than 7 mm from a plane in which said plural cold cathode ray tubes are arranged.

17. The liquid crystal display apparatus according to claim 12 wherein each dot of said light dimming dot pattern is printed on said light diffusing plate with an ink concocted with the concentration of the light shielding agent of 18 to 32 wt % and with the concentration of the light diffusing agent of 3.0 to 4.5 wt %.

18. The liquid crystal display apparatus according to claim 17 wherein said ink contains an ultraviolet ray inhibitor having a concentration in the ink of 0 to 7 wt % and an anti-foaming agent having a concentration in the ink of 0 to 1 wt %.

19. The liquid crystal display apparatus according to claim 17 wherein the number of times of applying the ink in printing said light dimming dot pattern on said light diffusing plate is usually one and, if the ink is printed by overlay printing, the number of times of applying the ink is limited to two or three.

20. The liquid crystal display apparatus according to claim 12 wherein the dots of said light dimming dot pattern are printed on said light diffusing plate in a staggered configuration at a distance of 1.2 to 2 mm along the longitudinal direction of said cold cathode ray tube one from another and at a distance of 0.5 to 1 mm along the direction orthogonal to said longitudinal direction one from another.

21. The liquid crystal display apparatus according to claim 12 wherein said light dimming dot pattern is formed on one major surface of said light diffusing plate facing said cold cathode ray tubes or on the major surface opposite to said one major surface.

22. The liquid crystal display apparatus according to claim 12 wherein said light dimming dot pattern is formed on said light diffusing light guide plate by depositing a transparent film, having printed thereon said light dimming dot pattern, on said one major surface or on said opposite major surface of said light diffusing plate.

23. A backlight device comprising
a light source made up by a plurality of light emitting diodes, radiating red light, green light and blue light; and
a light diffusing light guide plate arranged in the direction of light projection of said light source, said light diffusing light guide having a transmittance for all light rays of 50 to 93% and a cloud value of 70% to 93%, said light diffusing light guide plate carrying a light dimming dot pattern and configured for mixing the red light, green light and blue light incident thereon; wherein
dots of said light dimming dot pattern are formed facing said light emitting diodes on said light diffusing light guide plate with one-for-one correspondence to said light emitting diodes so that the dot shape is symmetrical or non-symmetrical relative to the center of light emission of said light emitting diode, with the area of each dot being 28 to 86 mm².

24. The backlight device according to claim 23 wherein each dot of said light dimming dot pattern is printed on said light diffusing plate with an ink concocted with the concentration of a light shielding agent of 18 to 32 wt % and with the concentration of a light diffusing agent of 3.0 to 4.5 wt %.

25. The backlight device according to claim 24 wherein said ink contains an ultraviolet ray inhibitor having a concentration in the ink of 0 to 7 wt % and an anti-foaming agent in the ink of 0 to 1 wt %.

26. The backlight device according to claim 24 wherein the number of times of applying the ink in printing said light dimming dot pattern on said light diffusing plate is usually one and, if the ink is printed by overlay printing, the number of times of applying the ink is limited to two or three.

27. The backlight device according to claim 23 wherein said light dimming dot pattern is formed on one major surface of said light diffusing light guide plate facing said light source or on the opposite major surface thereof.

28. The backlight device according to claim 23 wherein said light dimming dot pattern is formed on said light diffusing light guide plate by depositing a transparent film, having printed thereon said light dimming dot pattern, on said one major surface or on said opposite major surface of said light diffusing light guide plate.

29. The backlight device according to claim 24 wherein the ink composition, dot shape and the dot area of dots of said light dimming dot pattern, printed on said light diffusing light guide plate in one-for-one correspondence to said light emitting diodes, are adjusted depending on respective color light beams radiated from said light emitting diodes.

30. A liquid crystal display apparatus including a light transmitting liquid crystal display panel and a backlight device for illuminating liquid crystal display panel from the back side thereof, said apparatus comprising
a light source made up by a plurality of light emitting diodes, radiating red light, green light and blue light; and
a light diffusing light guide plate arranged in the direction of light projection of said light source, for facing said light source, said light diffusing guide plate having a transmittance for all light rays of 50 to 93% and a cloud value of 70% to 93%, said light diffusing light guide plate carrying a light dimming dot pattern and configured for mixing the red light, green light and blue light incident thereon;
wherein,
dots of said light dimming dot pattern are formed facing said light emitting diodes on said light diffusing light guide plate with one-for-one correspondence to said light emitting diodes so that the dot shape is symmetrical or non-symmetrical relative to the center of light emission of said light emitting diode, with the area of each dot being 28 to 86 mm².

31. The liquid crystal display apparatus according to claim 30 wherein each dot of said light dimming dot pattern is printed on said light diffusing plate with an ink concocted with the concentration of the light shielding agent of 18 to 32 wt % and with the concentration of the light diffusing agent of 3.0 to 4.5 wt %.

32. The liquid crystal display apparatus according to claim 31 wherein said ink contains an ultraviolet ray inhibitor having a concentration in the ink of 0 to 7 wt % and an anti-foaming agent having a concentration in the ink of 0 to 1 wt %.

33. The liquid crystal display apparatus according to claim 31 wherein the number of times of applying the ink in printing said light dimming dot pattern on said light diffusing plate is usually one and, if the ink is printed by overlay printing, the number of times of applying the ink is limited to two or three.

34. The liquid crystal display apparatus according to claim 30 wherein said light dimming dot pattern is formed on one major surface of said light diffusing light guide plate facing said light source or on the opposite major surface thereof.

35. The liquid crystal display apparatus according to claim 30 wherein said light dimming dot pattern is formed on said light diffusing light guide plate by depositing a transparent film, having printed thereon said light dimming dot pattern, on said one major surface or on said opposite major surface of said light diffusing light guide plate.

36. The liquid crystal display apparatus according to claim 31 wherein the ink composition, dot shape and the dot area of dots of said light dimming dot pattern, printed on said light diffusing light guide plate in one-for-one correspondence to said light emitting diodes, are adjusted depending on respective color light beams radiated from said light emitting diodes.

* * * * *